US010660003B2

(12) United States Patent
Wei et al.

(10) Patent No.: US 10,660,003 B2
(45) Date of Patent: May 19, 2020

(54) METHODS AND RELATED DEVICES FOR OPTIMIZING A MOBILE EDGE COMPUTING (MEC) SYSTEM

(71) Applicants: HON HAI PRECISION INDUSTRY CO., LTD., New Taipei (TW); NATIONAL TAIWAN UNIVERSITY, Taipei (TW)

(72) Inventors: Hung-Yu Wei, Taipei (TW); Yung-Lin Hsu, Taipei (TW); Ching-Chun Chou, Taipei (TW)

(73) Assignees: HON HAI PRECISION INDUSTRY CO., LTD., New Taipei (TW); NATIONAL TAIWAN UNIVERSITY, Taipei (TW)

( * ) Notice: Subject to any disclaimer, the term of this patent is extended or adjusted under 35 U.S.C. 154(b) by 62 days.

(21) Appl. No.: 16/178,616

(22) Filed: Nov. 2, 2018

(65) Prior Publication Data

US 2019/0141593 A1 May 9, 2019

Related U.S. Application Data

(60) Provisional application No. 62/581,153, filed on Nov. 3, 2017.

(51) Int. Cl.
*H04W 36/12* (2009.01)
*H04W 8/26* (2009.01)
(Continued)

(52) U.S. Cl.
CPC ........ *H04W 36/12* (2013.01); *G06F 9/45558* (2013.01); *H04W 8/26* (2013.01);
(Continued)

(58) Field of Classification Search
CPC ................. H04W 36/12; H04W 24/02; H04W 36/00837; H04W 76/11; H04W 8/26;
(Continued)

(56) References Cited

U.S. PATENT DOCUMENTS

2018/0242204 A1* 8/2018 Zhu ................... H04W 36/0033
2019/0254108 A1* 8/2019 Iwai ....................... H04W 88/08

FOREIGN PATENT DOCUMENTS

WO 2013010463 A1 1/2013
WO 2017161562 A1 9/2017
WO 2017187011 A1 11/2017

* cited by examiner

*Primary Examiner* — Dady Chery
(74) *Attorney, Agent, or Firm* — ScienBiziP, P.C.

(57) ABSTRACT

A method performed by an MEC orchestrator includes: acquiring MEC computation-related information and User Equipment (UE) mobility-related information from an MEC system including a plurality of MEC entities, performing a classification procedure, based on the MEC computation-related information and the UE mobility-related information, to determine a behavior type of a UE, wherein the behavior type indicates whether to trigger a handover (HO) in the MEC system and whether to trigger a Virtual Machine (VM) migration in the MEC system, and providing an instruction table in response to the behavior type, wherein the instruction table including routing information for routing MEC traffic among one or more of the plurality of MEC entities.

18 Claims, 26 Drawing Sheets

100

(51) Int. Cl.
*G06F 9/455* (2018.01)
*H04W 76/11* (2018.01)
*H04W 36/00* (2009.01)
*H04W 24/02* (2009.01)

(52) U.S. Cl.
CPC ..... *H04W 24/02* (2013.01); *H04W 36/00837* (2018.08); *H04W 76/11* (2018.02); *G06F 2009/4557* (2013.01); *G06F 2009/45595* (2013.01)

(58) Field of Classification Search
CPC ................ H04W 76/27; G06F 9/45558; G06F 2009/4557; G06F 2009/45595
See application file for complete search history.

METHODS AND RELATED DEVICES FOR OPTIMIZING A MOBILE EDGE COMPUTING (MEC) SYSTEM

CROSS-REFERENCE TO RELATED APPLICATION(S)

The present application claims the benefit of and priority to a provisional U.S. Patent Application Ser. No. 62/581,153 filed 2017 Nov. 3, entitled "METHOD FOR MEC-ENABLED HETEROGENEOUS WIRELESS NETWORK". The disclosure of the application is hereby incorporated fully by reference into the present application.

FIELD

The present disclosure generally relates to wireless communication, and more particularly, to methods and related devices for optimizing a Mobile Edge Computing (MEC) system.

BACKGROUND

Mobile Edge Computing (MEC) represents cloud-computing capabilities at the edge of the wireless communication network. MEC provides shared computing resource, data storage and others, and facilitates a service environment that allows seamless access experience for services and applications.

However, the next generation (e.g., 5th Generation New Radio (5G NR)) wireless communication networks may have strict requirements for User Equipment (UE) mobility, energy saving and traffic loading balancing. Thus, there is a need in the art for an optimization mechanism for an MEC system.

SUMMARY

The present disclosure is directed to methods and related devices for optimizing a Mobile Edge Computing (MEC) system.

In one aspect of the present disclosure, a method performed by an MEC orchestrator is provided. The method includes: acquiring MEC computation-related information and User Equipment (UE) mobility-related information from an MEC system including a plurality of MEC entities, performing a classification procedure, based on the MEC computation-related information and the UE mobility-related information, to determine a behavior type of a UE, wherein the behavior type indicates whether to trigger a handover (HO) in the MEC system and whether to trigger a Virtual Machine (VM) migration in the MEC system, and providing an instruction table in response to the behavior type, wherein the instruction table including routing information for routing MEC traffic among one or more of the plurality of MEC entities.

In one aspect of the present disclosure, an MEC orchestrator is provided. The MEC orchestrator includes one or more non-transitory computer-readable media having computer-executable instructions embodied thereon and at least one processor coupled to the one or more non-transitory computer-readable media. The at least one processor is configured to execute the computer-executable instructions to acquire MEC computation-related information and UE mobility-related information from an MEC system including a plurality of MEC entities, perform a classification procedure, based on the MEC computation-related information and the UE mobility-related information, to determine a behavior type of a UE, wherein the behavior type indicates whether to trigger an HO in the MEC system and whether to trigger a VM migration in the MEC system, and provide an instruction table in response to the behavior type, wherein the instruction table includes routing information for routing MEC traffic among one or more of the plurality of MEC entities.

BRIEF DESCRIPTION OF THE DRAWINGS

Aspects of the exemplary disclosure are best understood from the following detailed description when read with the accompanying figures. Various features are not drawn to scale, and dimensions of various features may be arbitrarily increased or reduced for clarity of discussion.

DETAILED DESCRIPTION

Figure 1:
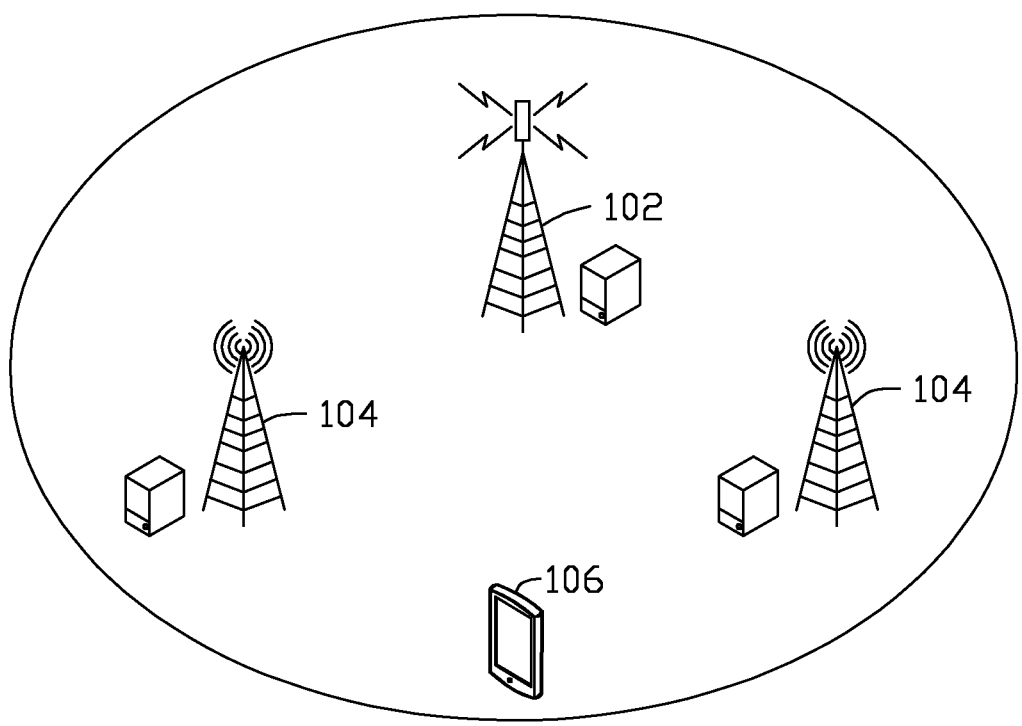
FIG. 1 illustrates a schematic diagram of an MEC system, according to an example implementation of the present disclosure.

The following description contains specific information pertaining to exemplary implementations in the present disclosure. The drawings in the present disclosure and their accompanying detailed description are directed to merely exemplary implementations. However, the present disclosure is not limited to merely these exemplary implementations. Other variations and implementations of the present disclosure will occur to those skilled in the art. Unless noted otherwise, like or corresponding elements among the figures may be indicated by like or corresponding reference numerals. Moreover, the drawings and illustrations in the present disclosure are generally not to scale, and are not intended to correspond to actual relative dimensions.

The following description contains specific information pertaining to example implementations in the present disclosure. The drawings in the present disclosure and their accompanying detailed description are directed to merely example implementations. However, the present disclosure is not limited to merely these example implementations. Other variations and implementations of the present disclosure will occur to those skilled in the art. Unless noted otherwise, like or corresponding elements among the figures may be indicated by like or corresponding reference numerals. Moreover, the drawings and illustrations in the present disclosure are generally not to scale, and are not intended to correspond to actual relative dimensions.

For the purpose of consistency and ease of understanding, like features are identified (although, in some examples, not shown) by numerals in the example figures. However, the features in different implementations may be differed in other respects, and thus shall not be narrowly confined to what is shown in the figures.

References to "one implementation," "an implementation," "example implementation," "various implementations," "some implementations," "implementations of the present application," etc., may indicate that the implementation(s) of the present application so described may include a particular feature, structure, or characteristic, but not every possible implementation of the present application necessarily includes the particular feature, structure, or characteristic. Further, repeated use of the phrase "in one implementation," or "in an example implementation," "an implementation," do not necessarily refer to the same implementation, although they may. Moreover, any use of phrases like "implementations" in connection with "the present application" are never meant to characterize that all implementations of the present application must include the particular feature, structure, or characteristic, and should instead be understood to mean "at least some implementations of the present application" includes the stated particular feature, structure, or characteristic. The term "coupled" is defined as connected, whether directly or indirectly through intervening components, and is not necessarily limited to physical connections. The term "comprising," when utilized, means "including, but not necessarily limited to"; it specifically indicates open-ended inclusion or membership in the so-described combination, group, series and the equivalent.

Additionally, for the purposes of explanation and non-limitation, specific details, such as functional entities, techniques, protocols, standard, and the like are set forth for providing an understanding of the described technology. In other examples, detailed description of well-known methods, technologies, system, architectures, and the like are omitted so as not to obscure the description with unnecessary details.

Persons skilled in the art will immediately recognize that any network function(s) or algorithm(s) described in the present disclosure may be implemented by hardware, software or a combination of software and hardware. Described functions may correspond to modules may be software, hardware, firmware, or any combination thereof. The software implementation may comprise computer executable instructions stored on computer readable medium such as memory or other type of storage devices. For example, one or more microprocessors or general purpose computers with communication processing capability may be programmed with corresponding executable instructions and carry out the described network function(s) or algorithm(s). The microprocessors or general purpose computers may be formed of applications specific integrated circuitry (ASIC), programmable logic arrays, and/or using one or more digital signal processor (DSPs). Although some of the example implementations described in this specification are oriented to software installed and executing on computer hardware, nevertheless, alternative example implementations implemented as firmware or as hardware or combination of hardware and software are well within the scope of the present disclosure.

The computer readable medium includes but is not limited to random access memory (RAM), read only memory (ROM), erasable programmable read-only memory (EPROM), electrically erasable programmable read-only memory (EEPROM), flash memory, compact disc read-only memory (CD ROM), magnetic cassettes, magnetic tape, magnetic disk storage, or any other equivalent medium capable of storing computer-readable instructions.

A radio communication network architecture (e.g., a long term evolution (LTE) system, a LTE-Advanced (LTE-A) system, or a LTE-Advanced Pro system) typically includes at least one base station, at least one UE, and one or more optional network elements that provide connection towards a network. The UE communicates with the network (e.g., a core network (CN), an evolved packet core (EPC) network, an Evolved Universal Terrestrial Radio Access network (E-UTRAN), a Next-Generation Core (NGC), or an internet), through a radio access network (RAN) established by the base station.

It should be noted that, in the present application, a UE may include, but is not limited to, a mobile station, a mobile terminal or device, a user communication radio terminal. For example, a UE may be a portable radio equipment, which includes, but is not limited to, a mobile phone, a tablet, a wearable device, a sensor, or a personal digital assistant (PDA) with wireless communication capability. The UE is configured to receive and transmit signals over an air interface to one or more cells in a radio access network.

A base station may include, but is not limited to, a node B (NB) as in the UMTS, an evolved node B (eNB) as in the LTE-A, a radio network controller (RNC) as in the UMTS, a base station controller (BSC) as in the GSM/GERAN, an NG-eNB as in an E-UTRA base station in connection with the 5GC, a next generation node B (gNB) as in the 5G-AN, and any other apparatus capable of controlling radio communication and managing radio resources within a cell. The base station may connect to serve the one or more UEs through a radio interface to the network.

A base station may be configured to provide communication services according to at least one of the following radio access technologies (RATs): Worldwide Interoperability for Microwave Access (WiMAX), Global System for Mobile communications (GSM, often referred to as 2G), GSM EDGE radio access Network (GERAN), General Packet Radio Service (GRPS), Universal Mobile Telecommunication System (UMTS, often referred to as 3G) based on basic wideband-code division multiple access (W-CDMA), high-speed packet access (HSPA), LTE, LTE-A, eLTE (evolved LTE), New Radio (NR, often referred to as 5G), and/or LTE-A Pro. However, the scope of the present application should not be limited to the above mentioned protocols.

The base station is operable to provide radio coverage to a specific geographical area using a plurality of cells forming the radio access network. The base station supports the operations of the cells. Each cell is operable to provide services to at least one UE within its radio coverage. More specifically, each cell (often referred to as a serving cell) provides services to serve one or more UEs within its radio coverage, (e.g., each cell schedules the downlink and optionally uplink resources to at least one UE within its radio coverage for downlink and optionally uplink packet transmissions). The base station can communicate with one or more UEs in the radio communication system through the plurality of cells. A cell may allocate sidelink (SL) resources for supporting proximity service (ProSe). Each cell may have overlapped coverage areas with other cells.

As discussed above, the frame structure for NR is to support flexible configurations for accommodating various next generation (e.g., 5G) communication requirements, such as enhanced mobile broadband (eMBB), massive machine type communication (mMTC), ultra-reliable communication and low latency communication (URLLC), while fulfilling high reliability, high data rate and low latency requirements. The orthogonal frequency-division multiplexing (OFDM) technology as agreed in 3GPP may serve as a baseline for NR waveform. The scalable OFDM numerology, such as the adaptive sub-carrier spacing, the channel bandwidth, and the Cyclic Prefix (CP), may also be used. Additionally, two coding schemes are considered for NR: (1) low-density parity-check (LDPC) code and (2) Polar Code. The coding scheme adaption may be configured based on the channel conditions and/or the service applications.

Moreover, it is also considered that in a transmission time interval TX of a single NR frame, a downlink (DL) transmission data, a guard period, and an uplink (UL) transmission data should at least be included, where the respective portions of the DL transmission data, the guard period, the UL transmission data should also be configurable, for example, based on the network dynamics of NR. In addition, sidelink resource may also be provided in an NR frame to support ProSe services.

FIG. 1 illustrates a schematic diagram of an MEC system 100, according to an example implementation of the present disclosure. The MEC system 100 includes at least one master node (MN) 102 (e.g., a Macro Cell eNodeB (MCeNB)) and a plurality of secondary nodes (SNs) 104 (e.g., Small Cell eNodeBs (SCeNBs)). The MEC system 100 may employ a mesh network topology, in which all the nodes (e.g., the MN 102 and the SNs 104) may communicate with each other directly.

Each of the MN 102 and the SNs 104 may be seen as an MEC entity providing MEC functions. For example, each SN 104 may include a Mobile Edge (ME) host. And, the MN 102 may include an MEC orchestrator (or "controller") to manage the operation of the ME hosts.

In the present implementation, the MN 102 may provide an extensive coverage area, which covers all the SNs 104. At least one User Equipment device (UE) 106 may locate in the coverage area of the MN 102, or simultaneously in the coverage areas of both the MN 102 and the SNs 104. A UE 106 may attach to the nearest in-coverage node. For example, if the coverage areas of more than one SN 104 are overlapped, the UE 106 may attach to the SN 104 with the best channel quality. If the UE 106 is only in the coverage area of the MN 102, the UE 106 may attach to the MN 102.

Each of the MN 102 and the SNs 104 may include a computation node for processing MEC traffics (e.g., the computation loading from the UE 106). Each computation node may include, for example, one or more Virtual Machines (VMs) to compute the computation loading from the UE 106.

The MN 102 may further include a controller, which may be configured for validating application rules and requirements and, if necessary, adjusting them to comply with operator policies. The controller can be deemed as an MEC orchestrator of the MEC system 100. In one implementation, the controller (or "MEC orchestrator") may be distributed on one or more MEC entities in the MEC system 100.

In the present implementation, once an SN 104 receives the computation loading from the UE 106, a VM migration process may be triggered if the SN 104 is unable to cope with the computation loading. During the VM migration, the SN 104 may migrate the received computation loading to the MN 102 or other SN(s) 104 capable of dealing with the computation loading. Generally, the computation node in the MN 102 is more powerful than that in the SNs 104. Therefore, the MN 102 may not migrate its computation loading to other node(s). For example, the computation node in the MN 102 may have a larger buffer size and/or better VM capability than the computation nodes in the SNs 104.

Furthermore, a handover (HO) process may be triggered if a UE 106 moves out the coverage area of its original serving node. During the HO process, the computation result (or "result data") of the computation loading may be forwarded to the UE 106 by the HO target node (e.g., a MN 102 or a SN 104).

In accordance with some implementations of the present disclosure, the MEC orchestrator (e.g., the MN 102) of the MEC system 100 may acquire MEC computation-related information and UE mobility-related information from the MEC system 100, and perform a classification procedure, based on the MEC computation-related information and the UE mobility-related information, to determine a behavior type of a UE (e.g., the UE 106). The behavior type may indicate the MEC system 100 whether to trigger a HO process and/or a VM migration. The MEC orchestrator may further provide one or more instruction tables that include routing information for routing MEC traffic among one or more MEC entities in the MEC system 100 according to the behavior type.

In one implementation, the MEC computation-related information may include information related to the computation loading and/or the SN computation capability. The MEC orchestrator may determine whether the computation loading distributed from a UE is to be computed on a selected MEC entity in the MEC system according to the MEC computation-related information.

In one implementation, the UE mobility-related information may include at least one of velocity information, acceleration information, direction information and location information. The MEC orchestrator may determine whether the UE leaves a coverage area of an MEC entity according to the UE mobility-related information.

For better comprehension, different behavior types of a UE are illustrated in reference with FIGS. 2 to 8. Among these figures, a dashed arrow may refer to a raw data path for transmitting raw data before computation. The raw data may refer to a computation loading distributed from an UE or an MEC entity that does not compute or process the computation loading. Also, a solid arrow may refer to a result data path for transmitting result data after computation. The result data may refer to a computation result of the computation loading, which may be generated by an MEC entity that has the ability to compute or process the computation loading.

Figure 2:
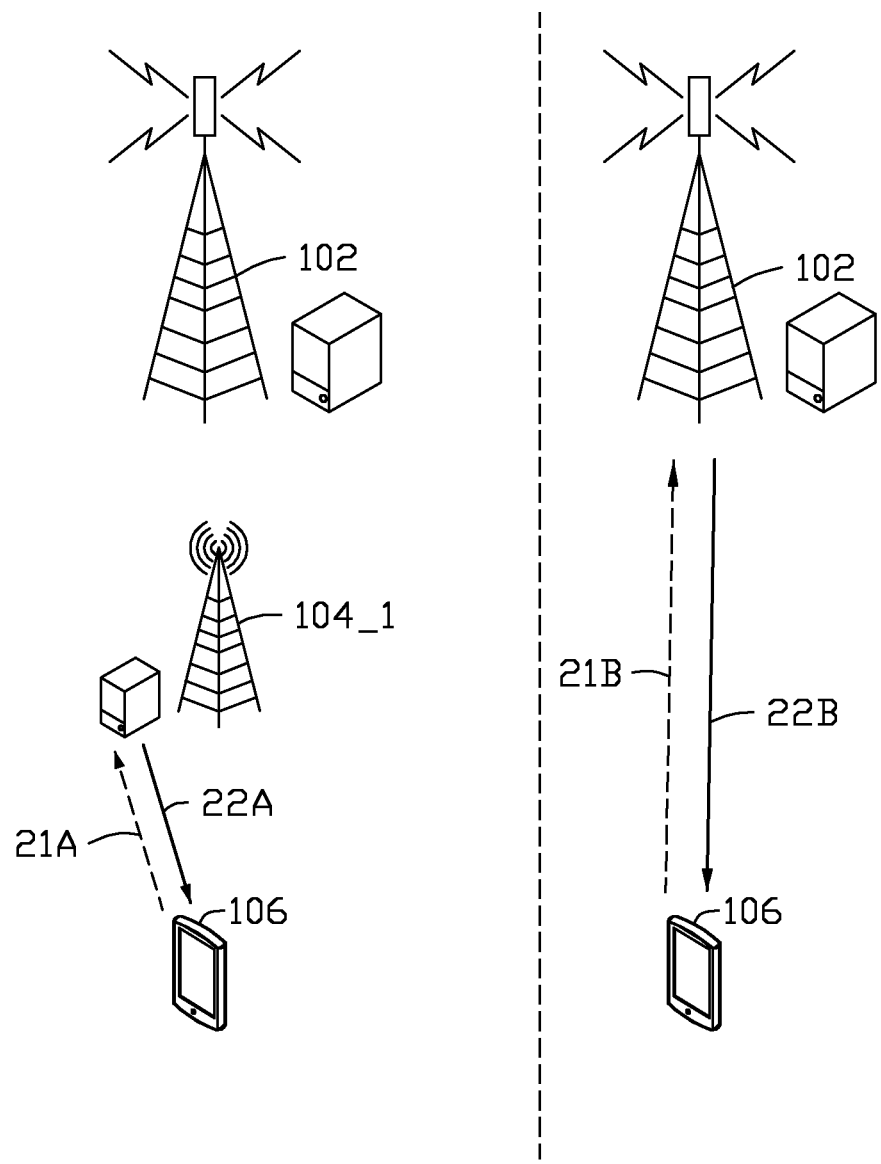
FIG. 2 is a schematic diagram of one of the behavior types, in accordance with an implementation of the present disclosure.

FIG. 2 is a schematic diagram of one of the behavior types, in accordance with an implementation of the present disclosure. In FIG. 2, neither the VM migration nor the HO process is triggered by the MEC system.

The scenario of FIG. 2 may be identified as "Type 1" behavior, in which the UE may keep staying in the coverage area of the original serving node that is able to cope with the computation loading distributed from the UE. In the present implementation, Type 1 may be further divided into two sub-types: "Type 1.S" and "Type 1.M." For Type 1.S, the serving node of the UE is an SN. For Type 1.M, the serving node of the UE is an MN.

As shown in the left part of FIG. 2, for Type 1.S, the UE 106 may distribute its computation loading to the serving node (e.g., the SN 104_1) through the raw data path 21A. Because the SN 104_1 is able to cope with the distributed computing loading, the SN 104_1 may compute the computation loading to generate the computation result, and send the computation result to the UE 106 through the result data path 22A.

Referring to the right part of FIG. 2, for Type 1.M, the computation loading is distributed from the UE 106 to the MN 102 through the raw data path 21B. Because the MN 102 is able to cope with the distributed computing loading, the MN 102 may compute the computation loading to generate the computation result, and send the computation result to the UE 106 through the result data path 22B.

Figure 3:
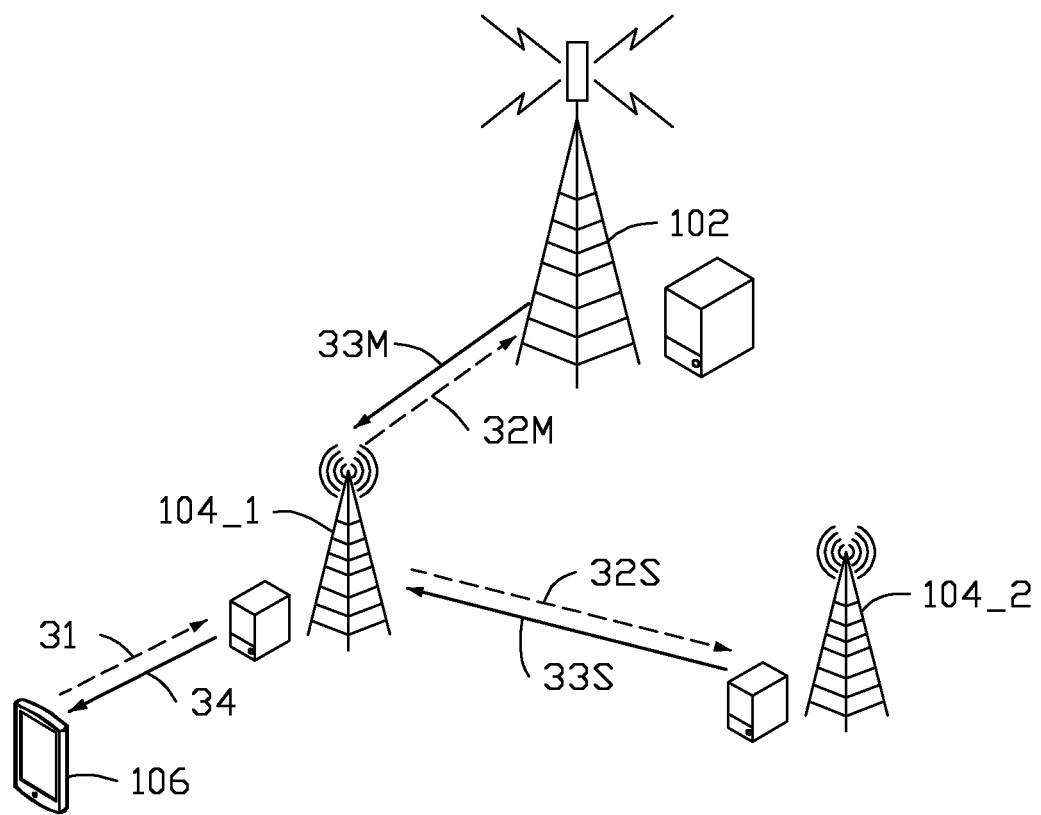
FIG. 3 is a schematic diagram of one of the behavior types, in accordance with an implementation of the present disclosure.

FIG. 3 is a schematic diagram of one of the behavior types, in accordance with an implementation of the present disclosure. In FIG. 3, the MEC system including the MN 102, the SN 104_1 and the SN 104_2 may only trigger the VM migration.

The scenario of FIG. 3 may be identified as "Type 2" behavior, in which the UE may keep staying in the coverage area of the original serving node that is not able to cope with the distributed computation loading.

As shown in FIG. 3, the UE 106 at first distributes its computation loading to the serving node (e.g., the SN 104_1) through the raw data path 31. If the SN 104_1 is not able to cope with the distributed computation loading, the SN 104_1 may trigger the VM migration to offload the received computation loading to the nearby SN (e.g., the SN 104_2) through the raw data path 32S or to the MN 102 through the raw data path 32M.

If the computation loading is computed at the SN 104_2, the SN 104_2 may generate and forward the computation result to the SN 104_1 through the result data path 33S.

If the computation loading is computed at the MN 102, the MN 102 may generate and forward the computation result to the SN 104_1 through the result data path 33M.

The SN 104_1 may then relay the received computation result to the UE 106 through the result data path 34.

Figure 4:
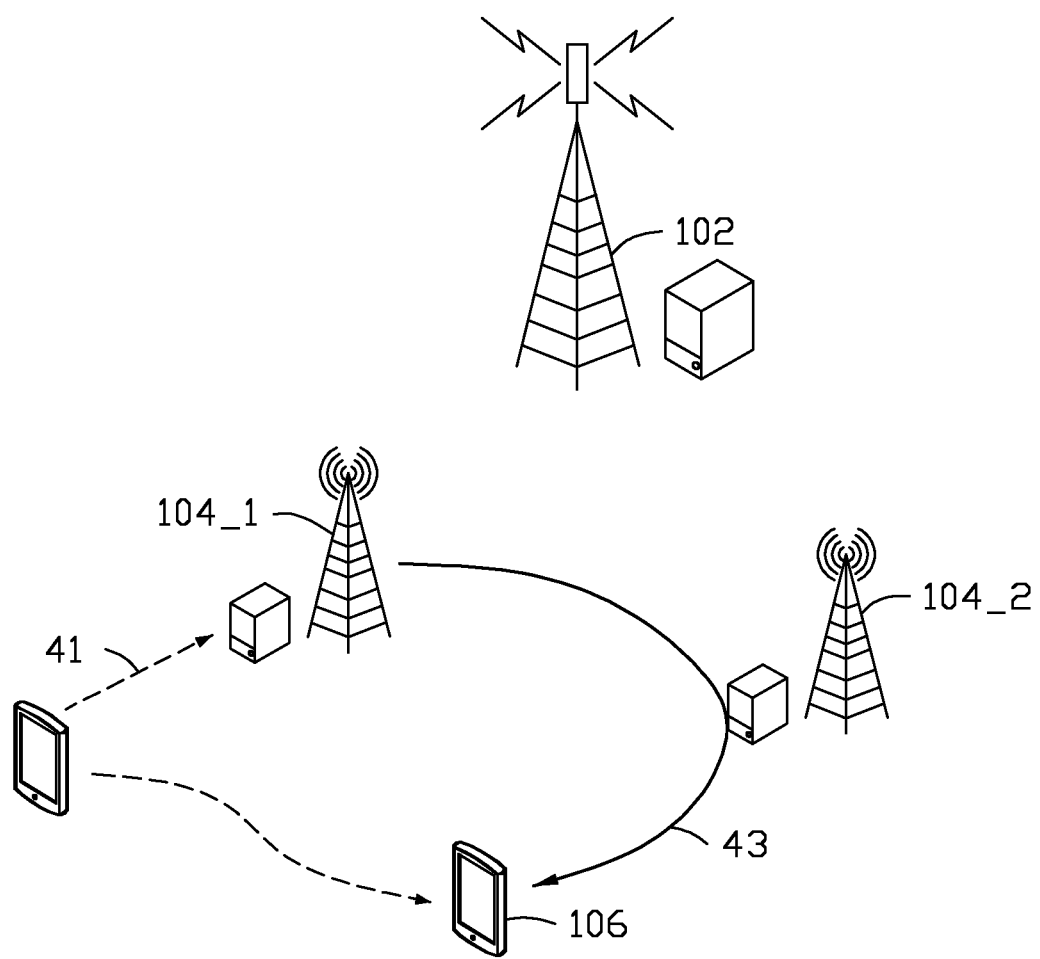
FIG. 4 is a schematic diagram of one of the behavior types, in accordance with an implementation of the present disclosure.

FIG. 4 is a schematic diagram of one of the behavior types, in accordance with an implementation of the present disclosure. In FIG. 4, the MEC system including the MN 102, the SN 104_1 and the SN 104_2 only triggers the HO process.

The scenario of FIG. 4 may be identified as "Type 3" behavior, in which the UE may move from a node that is able to cope with the computation loading to another node.

As shown in FIG. 4, the UE 106 at first distributes its computation loading to the source node (e.g., the SN 104_1) through the raw data path 41 before moving. Then, the UE 106 moves to the target node (e.g., the SN 104_2) before the SN 104_1 completes the computation of the computation loading. After the computation of the computation loading is completed, the SN 104_1 generates and forwards the computation result to the UE 106 through the result data path 43 (e.g., relayed by the SN 104_2).

Figure 5:
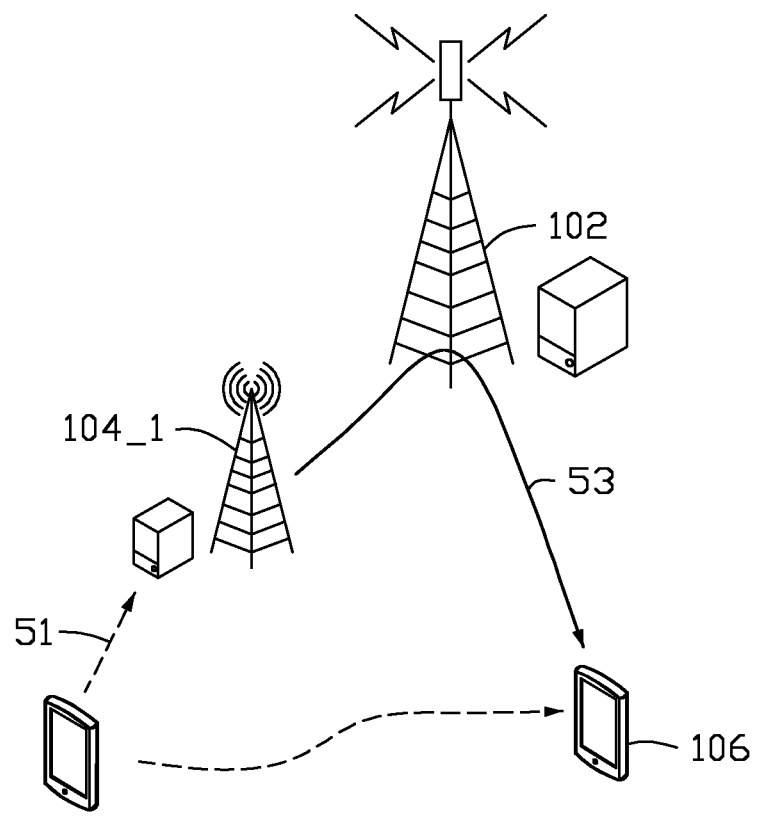
FIG. 5 is a schematic diagram of one of the behavior types, in accordance with an implementation of the present disclosure.

FIG. 5 is a schematic diagram of one of the behavior types, in accordance with an implementation of the present disclosure. In FIG. 5, the MEC system including the MN 102 and the SN 104_1 only triggers the HO process.

The scenario of FIG. 5 may be identified as "Type 4" behavior, in which the UE may move out of any coverage area of the SNs but still in the coverage area of the MN, and the original serving node of the UE is able to cope with the received computation loading.

As shown in FIG. 5, the UE 106 at first distributes its computation loading to the original serving node (e.g., the SN 104_1) through the raw data path 51 before moving. Then, the UE 106 moves out of the coverage area of the SN 104_1 before the SN 104_1 completes the computation of the computation loading. After the computation is completed, the SN 104_1 generates and forwards the computation result to the UE 106 through the result data path 53 (e.g., relayed by the MN 102).

Figure 6:
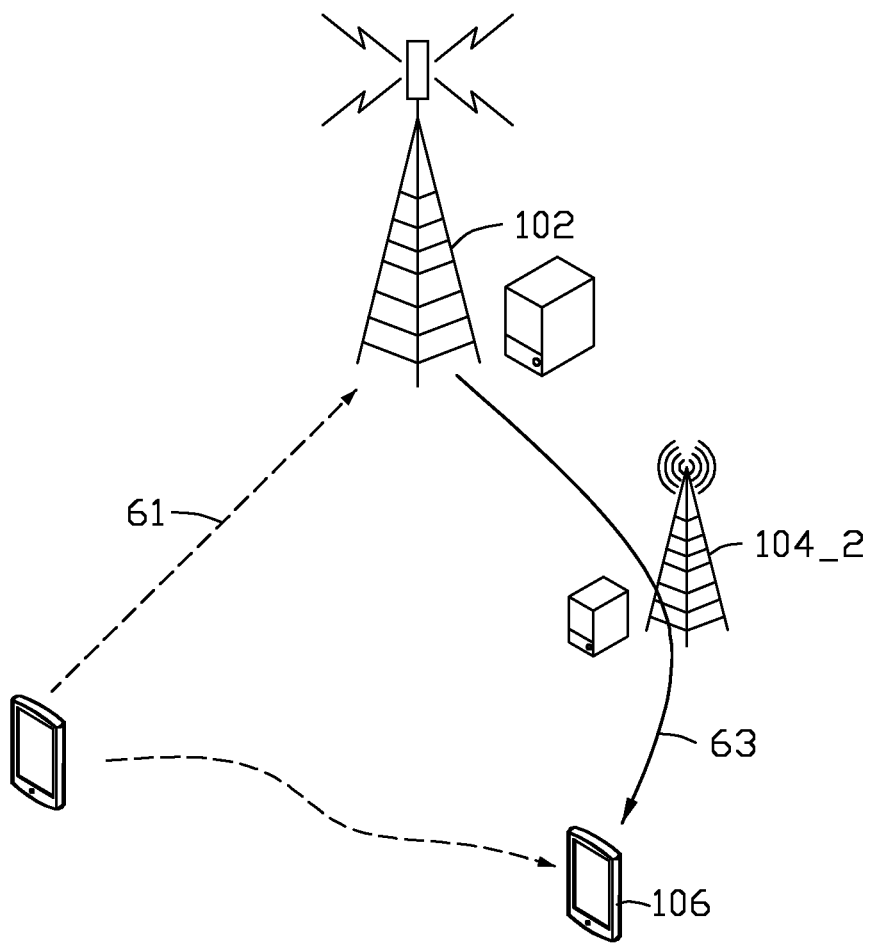
FIG. 6 is a schematic diagram of one of the behavior types, in accordance with an implementation of the present disclosure.

FIG. 6 is a schematic diagram of one of the behavior types, in accordance with an implementation of the present disclosure. In FIG. 6, the MEC system including the MN 102 and the SN 104_2 only triggers the HO process.

The scenario of FIG. 6 may be identified as "Type 5" behavior, in which the UE may move from the coverage area of the MN to any coverage area of the SN(s).

As shown in FIG. 6, the UE 106 at first distributes its computation loading to the MN 102 through the raw data path 61 before moving. Then, the UE 106 moves to the coverage area of the SN 104_2. After the MN 102 completes the computation of the computation loading, the MN 102 may generate and forward the computation result to the UE 106 through the result data path 63 (e.g., relayed by the SN 104_2).

Figure 7:
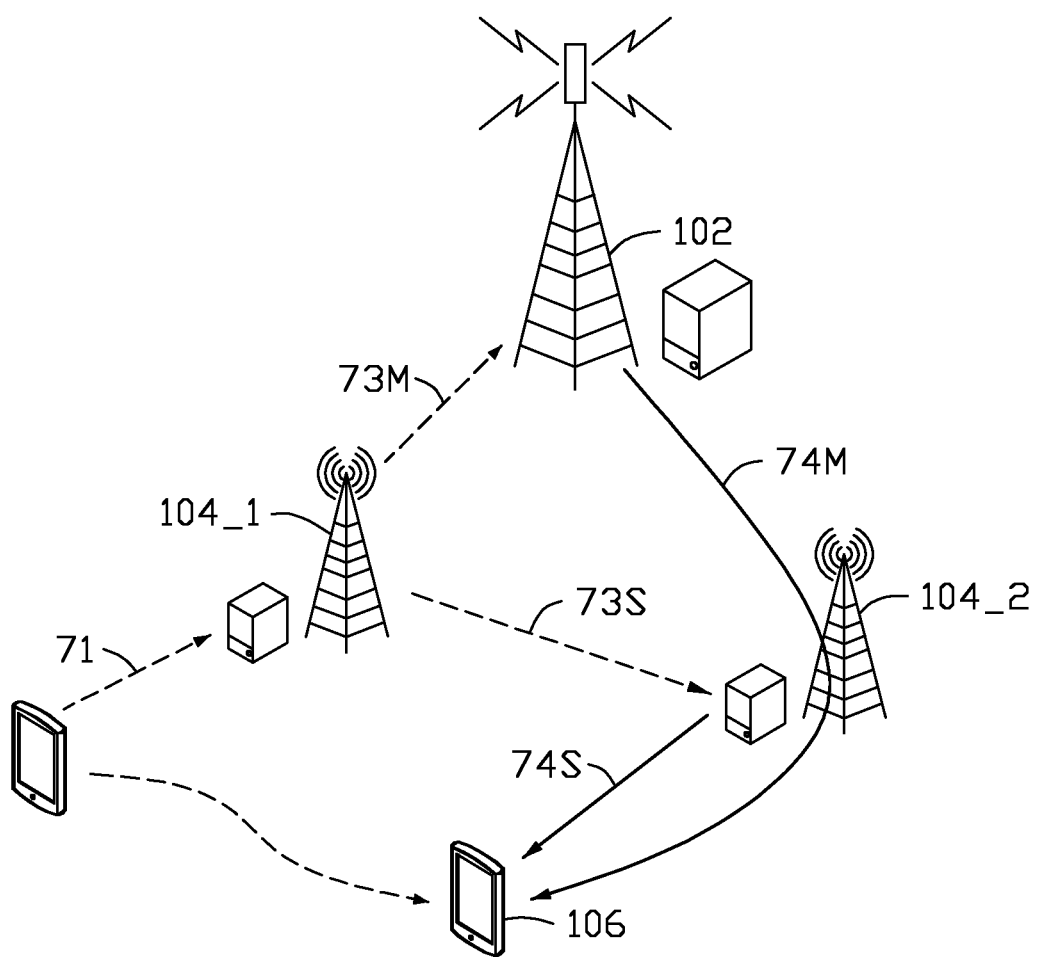
FIG. 7 is a schematic diagram of one of the behavior types, in accordance with an implementation of the present disclosure.

FIG. 7 is a schematic diagram of one of the behavior types, in accordance with an implementation of the present disclosure. In FIG. 7, the MEC system including the MN 102, the SN 104_1 and the SN 104_2 may trigger both the HO process and the VM migration.

The scenario of FIG. 7 may be identified as "Type 6" UE behavior, in which a UE may move from a source node to another node, while the source node is not able to cope with the computation loading distributed from the UE.

As shown in FIG. 7, the UE 106 at first distributes its computation loading to the source node (e.g., the SN 104_1) through the raw data path 71 before moving.

If the source node (e.g., the SN 104_1) is not able to cope with the distributed computation loading, the source node may trigger VM migration to migrate the computation loading to the nearby SN (e.g., the SN 104_2) through the raw data path 73S or to the MN 102 through the raw data path 73M.

If the computation loading is computed at the SN 104_2, the SN 104_2 may generate and forward the computation result to the UE 106 through the result data path 74S.

If the computation loading is computed at the MN 102, the MN 102 may generate and forward the computation result to the UE 106 through the result data path 74M (e.g., relayed by the SN 104_2).

Figure 8:
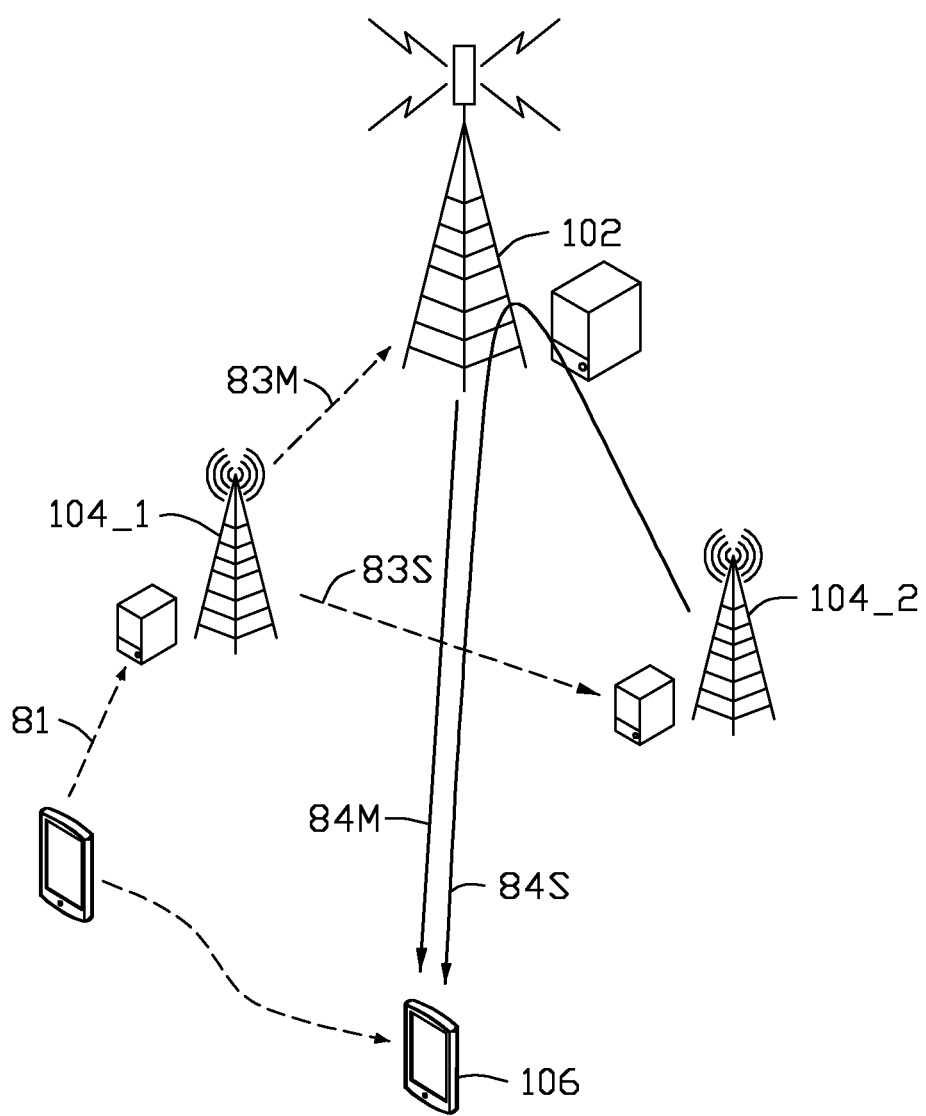
FIG. 8 is a schematic diagram of one of the behavior types, in accordance with an implementation of the present disclosure.

FIG. 8 is a schematic diagram of one of the behavior types, in accordance with an implementation of the present disclosure. In FIG. 8, the MEC system including the MN 102, the SN 104_1 and the SN 104_2 may trigger both the HO process and the VM migration.

The scenario of FIG. 8 may be identified as "Type 7" UE behavior, in which a UE may move out of any coverage area of the SN(s) but still in the coverage area of the MN, and the original serving SN is not able to cope with the computation loading distributed from the UE.

As shown in FIG. 8, the UE 106 at first distributes its computation loading to the original serving node (e.g., the SN 104_1) through the raw data path 81 before moving.

If the SN 104_1 is not able to cope with the distributed computation loading, the SN 104_1 may trigger VM migration to migrate the computation loading to the nearby SN (e.g., the SN 104_2) through the raw data path 83S or to the MN 102 through the raw data path 83M.

If the computation loading is computed at the SN 104_2, the SN 104_2 may generate and forward the computation result to the UE 106 through the result data path 84S (e.g., relayed by the MN 102).

If the computation loading is computed at the MN 102, the MN 102 may generate and forward the computation result to the UE 106 through the result data path 84M.

Tables I, II and III summarize the various behavior types as discussed in FIGS. 2 to 8.

TABLE I

| Behavior Type | | |
|---|---|---|
| Type 1 | .S | No HO process, no VM migration |
| | .M | |
| Type 2 | .S | VM migration only |
| | .M | |

TABLE I-continued

| Behavior Type | | |
|---|---|---|
| Type 3 | (.S) | HO process only: case I |
| Type 4 | (.S) | HO process only: case II |
| Type 5 | (.M) | HO process only: case III |
| Type 6 | .S | VM migration with HO process: case I |
| | .M | |
| Type 7 | .S | VM migration with HO process: case II |
| | .M | |

TABLE II

| UE moving case | |
|---|---|
| Case I | from SN_i to SN_k (i≠k) |
| Case II | from SN_i to MN |
| Case III | from MN to SN_i |

TABLE III

| Source of computation result | |
|---|---|
| .S | from SN_i |
| .M | from MN |

In some implementations, the HO process and the VM migration scenarios may be compatible with ETSI GR MEC 018 4.1.2 mobility scenarios in the MEC system. When the HO process and/or the VM migration happen(s), the number of the target node may be one or many, which means that in some cases it may be a target node group to enhance the serving continuity.

Furthermore, once a UE attaches to a serving node (e.g., an MN or an SN), the UE may distribute its computation loading to the serving node. If the place where the computation loading is computed is known, the behavior type of the UE could be figured out by certain classification procedure(s). For example, according to the present implementation, two classification procedures are proposed: (1) MN Classification Box (MCCB) procedure and (2) SN Classification Box (SCCB) procedure.

Figure 9:
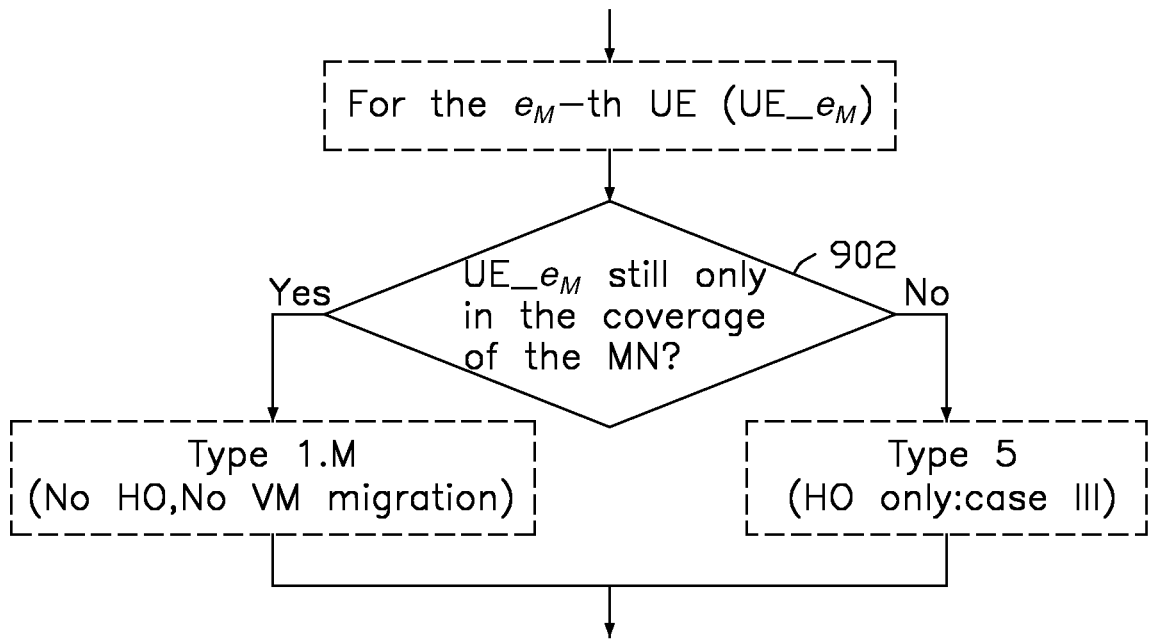
FIG. 9 illustrates a flowchart of an MCCB procedure, in accordance with an implementation of the present disclosure.

FIG. 9 illustrates a flowchart of an MCCB procedure, in accordance with an implementation of the present disclosure. As shown in FIG. 9, in action 902, the MEC orchestrator may determine whether the $e_M$-th UE (or "UE_$e_M$") in the MEC system stays only in the coverage of the MN according to the UE mobility-related information (e.g., the velocity, acceleration and/or location of the UE_$e_M$).

If the outcome of the determination in action 902 is Yes, the MEC orchestrator may determine that the behavior type is Type 1.M, which means that for the UE_$e_M$, no HO process and no VM migration happens.

If the outcome of the determination in action 902 is No, the MEC orchestrator may determine that the behavior type is Type 5 with case III, which means that for the UE_$e_M$, only the HO process happens.

Figure 10:
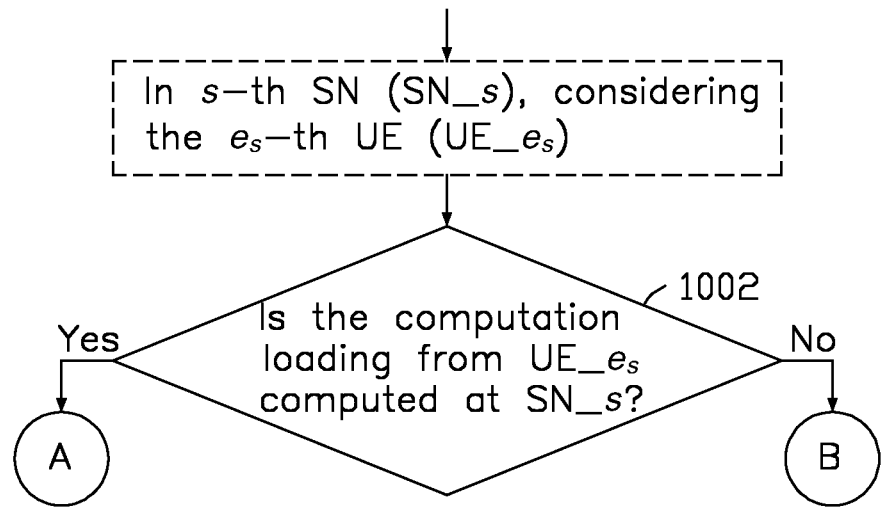
FIG. 10 illustrates a flowchart of an SCCB procedure, in accordance with an implementation of the present disclosure.

FIG. 10 illustrates a flowchart of an SCCB procedure, in accordance with an implementation of the present disclosure. As shown in FIG. 10, in action 1002, for the $e_s$-th UE (or "UE_$e_s$") attaching to the s-th SN (or "SN_s") in the MEC system, the MEC orchestrator may determine whether the computation loading from the UE_$e_s$ is computed at the SN_s according to the MEC computation-related information. For example, if the MEC computation-related information indicates that the SN_s's computation power is insufficient for handling the computation loading, the MEC orchestrator may determine that the computation loading from the $UE\_e_s$ is not computed at the SN_s.

If the outcome of the determination in action 1002 is Yes, the SCCB procedure then proceeds with the procedure node A. Otherwise, the SCCB procedure proceeds with the procedure node B.

Figure 11:
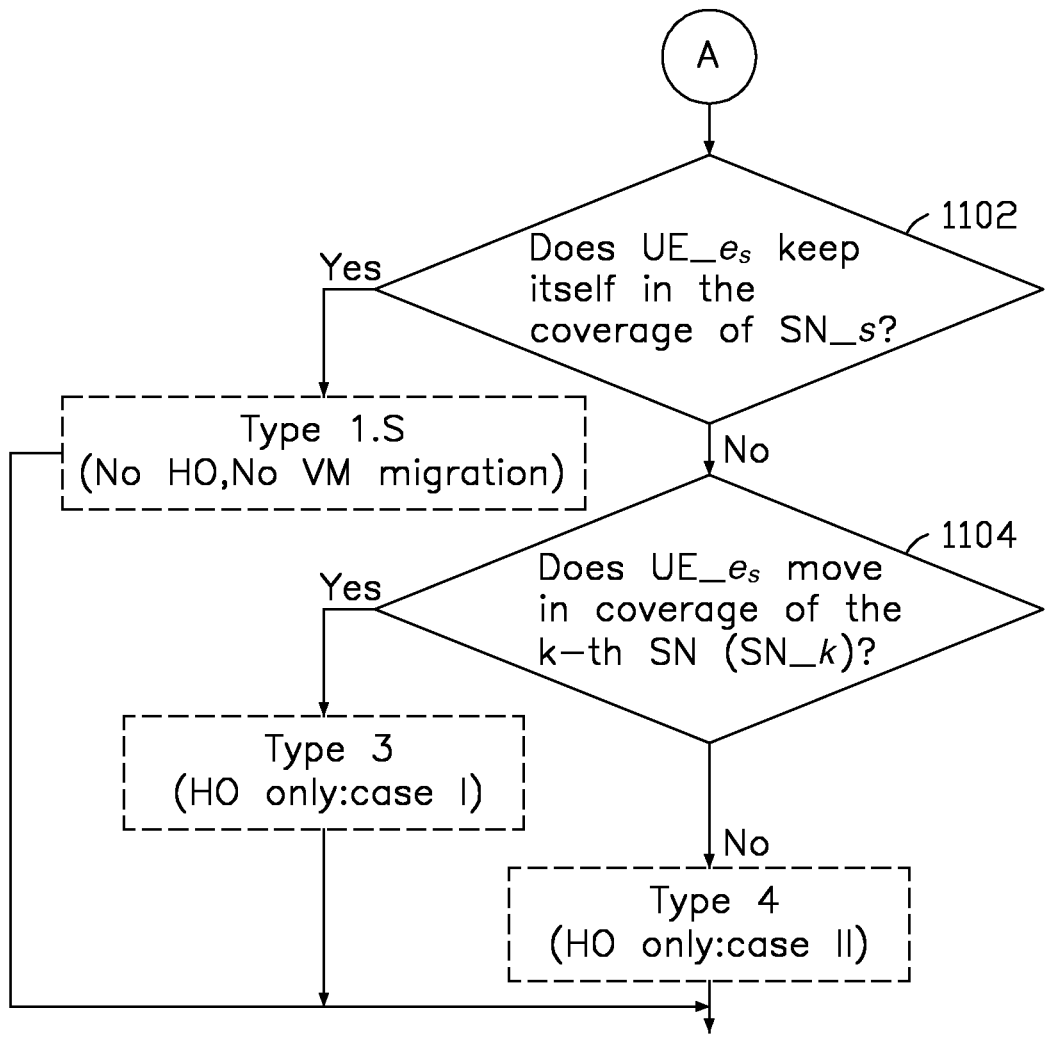
FIG. 11 is a flowchart of an SCCB sub-procedure, in accordance with an implementation of the present disclosure.

FIG. 11 is a flowchart of an SCCB sub-procedure starting from the procedure node A, in accordance with an implementation of the present disclosure. As shown in FIG. 11, in action 1102, the MEC orchestrator may check whether the $UE\_e_s$ keeps itself in the coverage of the SN_s or not according to the UE mobility-related information. If yes, the behavior type may be determined as "Type 1.S," which means that for the $UE\_e_s$, no HO process and no VM migration happens. Otherwise, in action 1104, the MEC orchestrator may further use the UE mobility-related information to check whether the $UE\_e_s$ moves in the coverage of the k-th SN (or "SN_k") or not, where k≠s.

If the outcome of the determination in action 1104 is Yes, the MEC orchestrator may determine that the behavior type is case I of Type 3 (see Table I to Table III).

If the outcome of the determination in action 1104 is No, the MEC orchestrator may determine that the behavior type is case II of Type 4 (see Table I to Table III).

Figure 12:
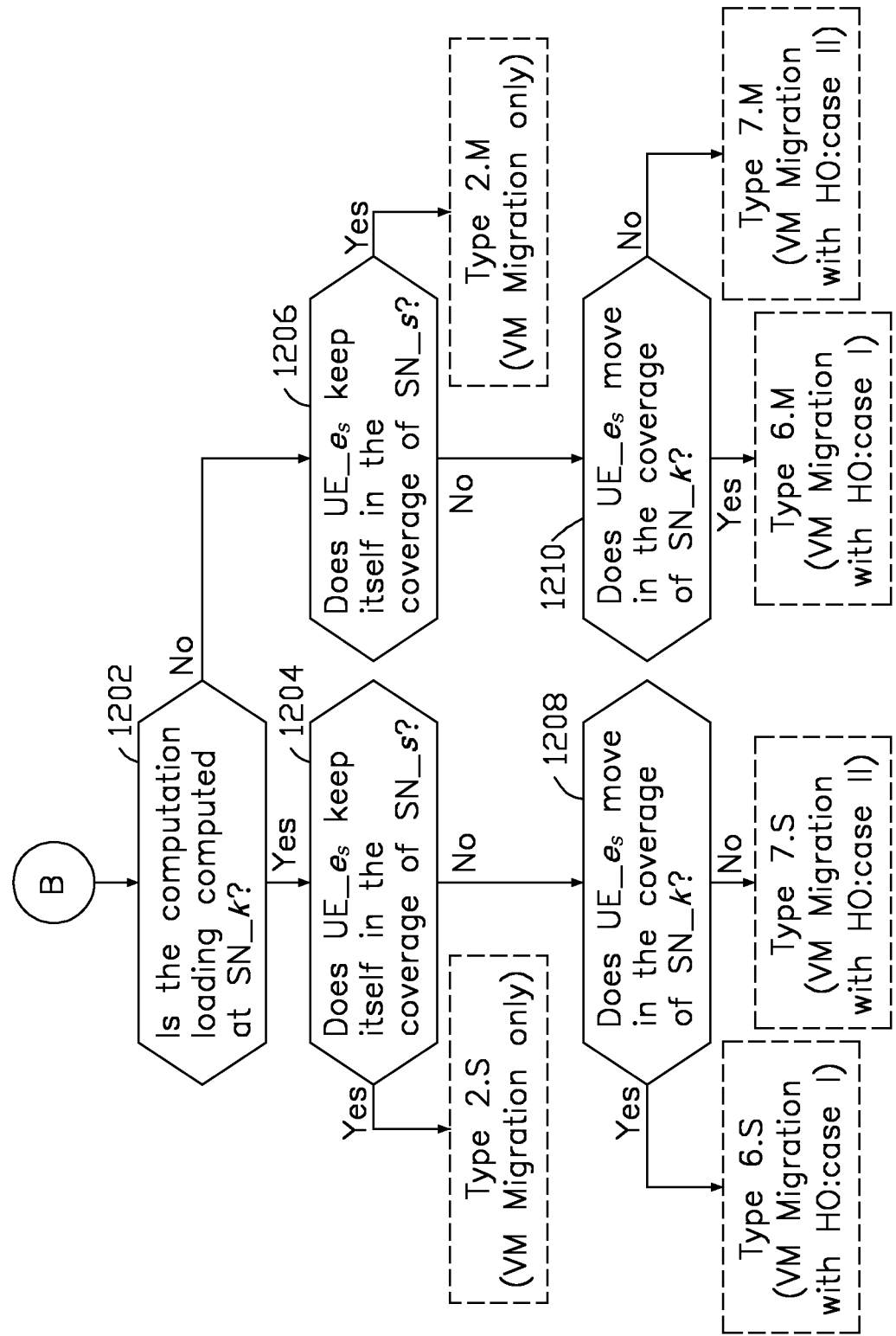
FIG. 12 is a flowchart of an SCCB sub-procedure, in accordance with an implementation of the present disclosure.

FIG. 12 is a flowchart of an SCCB sub-procedure starting from the procedure node B, in accordance with an implementation of the present disclosure. As shown in FIG. 12, in actions 1202, the MEC orchestrator determines whether the computation loading is computed at the SN_k according to the MEC computation-related information.

In actions 1204 and 1206, the MEC orchestrator further determines whether the $UE\_e_s$ keeps itself in the coverage of the SN_s according to the UE mobility-related information.

If the outcome of the determination in action 1204 is Yes, the MEC orchestrator may determine that the behavior type is "Type 2.S," which means that for the $UE\_e_s$, only the VM migration happens.

If the outcome of the determination in action 1204 is No, in action 1208, the MEC orchestrator further checks whether the $UE\_e_s$ moves to the coverage area of the SN_k. If yes, the behavior type of the $UE\_e_s$ may be classified as "Type 6.S," which means that for the $UE\_e_s$, both the VM migration and the HO process may happen. If not, the behavior may be classified as "Type 7.S," which means that the $UE\_e_s$ may move out of any SN's coverage area, but still in the MN's coverage area.

If the outcome of the determination in action 1206 is Yes, the MEC orchestrator may determine that the behavior type is "Type 2.M," which means that for the $UE\_e_s$, only VM migration occurs, and the computation loading will be migrated to the MN.

If the outcome of the determination of action 1206 is No, in action 1210, the MEC orchestrator may further determine whether the $UE\_e_s$ moves to the coverage area of the SN_k according to the UE mobility-related information.

If the outcome of the determination in action 1210 is Yes, the behavior type is classified as "Type 6.M," which means that for the $UE\_e_s$, both the VM migration and the HO process happen. Otherwise, the behavior type is classified as "Type 7.M," which means that the $UE\_e_s$ may move out of any SN's coverage area, but still in the MN's coverage area.

In accordance with various implementations of the present disclosure, the behavior types of a UE can be used in a Traffic-Based MEC Migration (TBMM) procedure, so as to achieve an MEC traffic loading based dynamic centralized control system.

Figure 13:
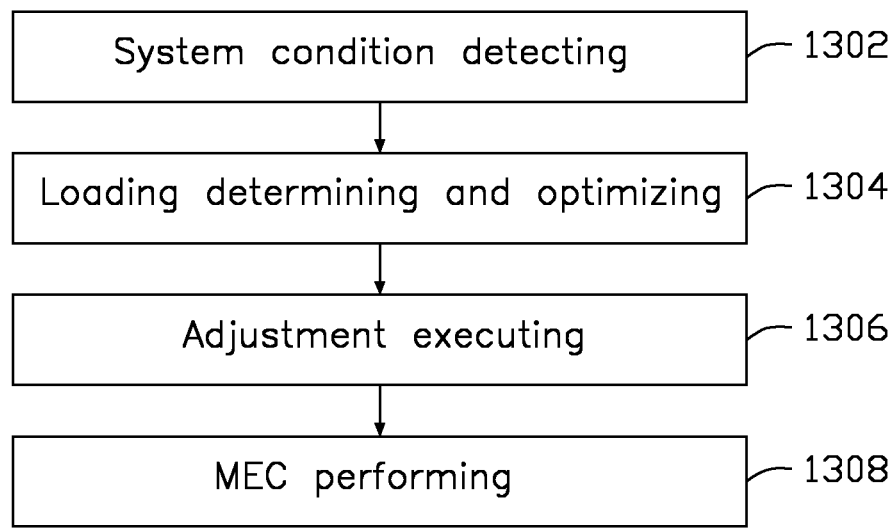
FIG. 13 illustrates a flowchart of a TBMM procedure, in accordance with an implementation of the present disclosure.

FIG. 13 illustrates a flowchart of a TBMM procedure, in accordance with an implementation of the present disclosure.

The TBMM procedure includes actions 1302, 1304, 1306 and 1308. In action 1302, a system condition detecting (SCD) procedure is performed, in which the MEC orchestrator may collect the system condition information (e.g., the overall loading condition of the MEC system) from SN(s) and/or the UE.

In action 1304, a loading determining and optimizing (LDO) procedure is performed, in which the MEC orchestrator may determine the system computation loading level according to the system condition information, and optimize the MEC system's computation resource allocation based on the system computation loading level. After the optimization, the MEC orchestrator may perform a classification procedure (e.g., the MCCB or SCCB procedure) to determine the UE's behavior type.

In action 1306, an adjustment executing (AE) procedure is performed, in which the MEC system may execute the optimized computation resource allocation scheme, and rout the computation loading among different MEC entities.

In action 1308, an MEC performing procedure is performed, in which the distributed computation loading is computed in this period. After the computation is completed, the computation result is generated and routed back to the UE through one or more MEC entities.

Figure 14:
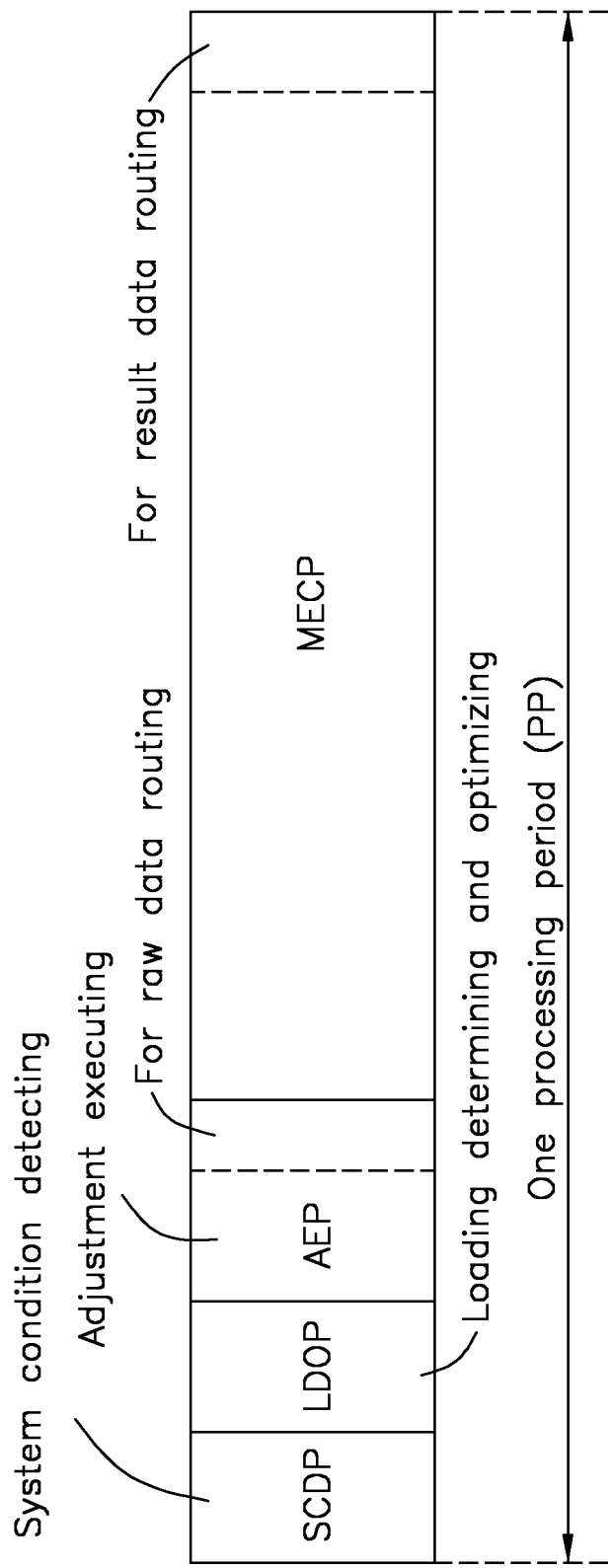
FIG. 14 illustrates a time allocation of a TBMM procedure for a processing period (PP), in accordance with an implementation of the present disclosure.

FIG. 14 illustrates a time allocation of a TBMM procedure for a processing period (PP), in accordance with an implementation of the present disclosure. As shown in FIG. 14, for one processing period, the SCD procedure, the LCD procedure, the AE procedure, and the MEC performing procedure are performed in four consecutive time periods, SCDP, LDOP, AEP and MECP, respectively. The periods AEP and MECP each may include a routing period. The routing period included in the period AEP may be used for routing the computation loading (or, raw data). The routing period included in the period MECP may be used for routing the computation result (or, result data).

Figure 15:
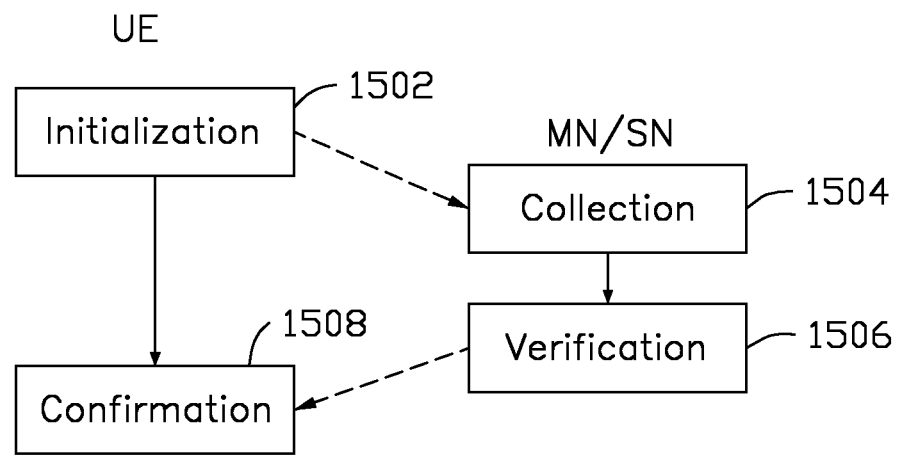
FIG. 15 illustrates a flowchart of the SCD procedure, in accordance with an implementation of the present disclosure.

FIG. 15 illustrates a flowchart of the SCD procedure, in accordance with an implementation of the present disclosure. In action 1502, the UE (e.g., the UE 106) performs initialization. For example, the UE may attach to its serving SN/MN and transmit initialization information to the serving MN or SN.

The initialization information may include the UE mobility-related information and the MEC computation-related information. The UE mobility-related information may include, for example, the UE's identity (ID) information (e.g., Internet Protocol (IP) address, and/or ID number) and/or mobility and geography information (e.g., velocity, acceleration, and/or Global Positioning System (GPS) location). The MEC computation-related information may include, for example, the application requirement (e.g., the size of computation loading and/or Round Trip Time (RTT) limits), and/or the channel estimation information (e.g., the Sounding Reference Signal (SRS) in LTE).

In actions 1504 and 1506, the serving MN or SN collects the initialization information from the UE, and verifies the collected initialization information.

In action 1508, the UE may generate confirmation information after the initialization information is verified by the MN or SN.

Figure 16:
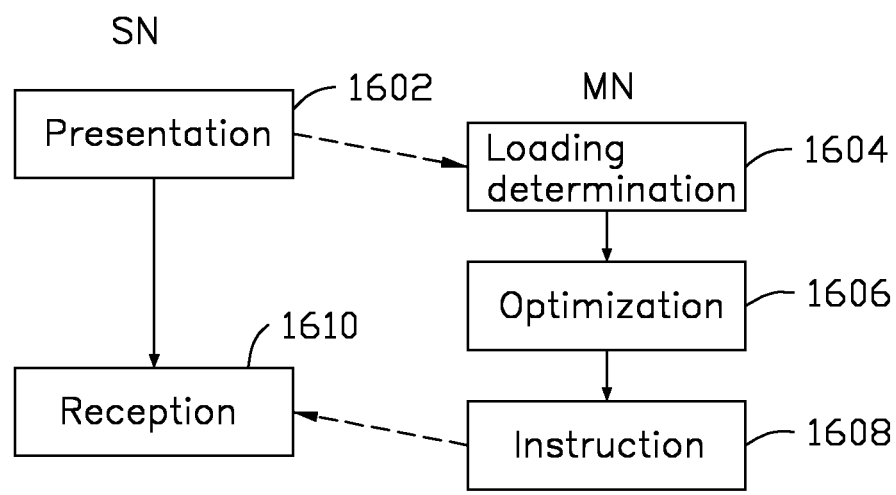
FIG. 16 illustrates a flowchart of an LDO procedure, in accordance with an implementation of the present disclosure.

FIG. 16 illustrates a flowchart of an LDO procedure, in accordance with an implementation of the present disclosure. In the present implementation, the LDO procedure includes actions 1602 to 1610.

In action 1602, the SN may perform a presentation process, in which the SN may report presentation information to the MN. The presentation information may include, for example, the initialization information from the UE.

In action 1604, the MN may determine a system computation loading level according to the presentation information. For example, the MN may coordinate with the SN(s) to monitor and determine the system computation loading in each time period, and divide the system computation loading into a plurality of system computation loading levels.

In one implementation, the MN may compare the system computation loading with one or more loading thresholds to determine the system computation loading level. For example, the MN may classify the system computation loading into a heavy computation (HC) loading level, a medium computation (MC) loading level and a light computation (LC) loading level by comparing the system computation loading with a HC threshold and a LC threshold that is lower than the HC threshold. In such a case, the system computation loading may be classified as the HC loading level when the system computation loading is above the HC threshold, classified as the MC loading level when the system computation loading is between the HC threshold and the LC threshold, and classified as the LC loading level when the system computation loading is below the LC threshold. It is noted that the number of system computation loading levels can vary. For example, the MN may divide the system computation loading into two levels by using a single loading threshold.

In one implementation, each SN in the MEC system may estimate its own computation loading. According to the self-estimation of the SN(s), each SN may raise its adjustment request individually to ask for VM migration or a change of its operation state (e.g., switching to an idle state) when the system computation loading level is determined as the MC loading level. In terms of the overall system stability, the MN may accept or reject the adjustment request.

In action 1606, the MN may optimize the system computation loading based on the system computation loading level.

In one implementation, the MN may optimize the system computation loading by performing one of a plurality of adjustment procedures in response to the system computation loading level. Each adjustment procedure may correspond to a system computation loading level. For example, the adjustment procedures may include a first adjustment procedure, a second adjustment procedure and a third adjustment procedure. The MN may perform the first adjustment procedure and the third adjustment procedure when the system computation loading is classified as the LC loading level and the HC loading level, respectively. When the system computation loading is classified as the MC loading level, the MN may perform the second adjustment procedure in response to an adjustment request from an SN is received.

During the first adjustment procedure, the MN may turn off a computation node of an MEC entity that operates in an idle state. During the second adjustment procedure, the MN may adjust the operation state or the loading state of an MEC entity according to the adjustment request. During the third adjustment procedure, the MN may offload the computation loading from an MEC entity to another MEC entity.

In action 1608, the MN may transmit an instruction table to the SN. The instruction table may include routing information for routing MEC traffic (e.g., the computation loading and/or the computation result) among one or more MEC entities in the MEC system. The routing information may include a first routing path (or raw data path) and a second routing path (or result data path). The first routing path may indicate a first pair of MEC entities between which a computation loading is to be transmitted. The second routing path may indicate a second pair of MEC entities between which the computation result is to be transmitted.

In one implementation, the instruction table may further include at least one VM ID, at least one UE ID, and at least one task tag associated with the routing information. The task tag may be generated from the UE ID and the VM ID. For example, the task tag may be generated by multiplying the UE ID and the VM ID. In some implementations, the instruction table may further include at least one MEC entity ID to indicate the routing source or destination.

In action 1610, the SN receives the instruction table from the MN.

In the present implementation, there may be several types of the instruction table. For example, the instruction table may be a preservation table, a relay table or an acceptance table. Details of these tables are described below.

Preservation Table to SN

A preservation table sent to an SN may instruct the SN to keep and compute the computation loading received from a UE or another SN. An example of the preservation table is shown in Table IV-1.

TABLE IV-1

| # of VM (VM ID) | 1 | | 2 | | ... | k | | |
|---|---|---|---|---|---|---|---|---|
| UE ID | 1 | 2 | 5 | N/A | ... | 1 | 4 | 7 |
| Task TAG | 1 | 2 | 5 | N/A | ... | k | 4k | 7k |

According to Table IV-1, there are k VMs (or applications). VM #1 is instructed to keep and compute the computation loadings from the UEs with the UE ID=1, 2 and 5, respectively. For VM #2, there is no computation loading that needs to be kept and compute. For VM # k, it is instructed to keep and compute the computation loadings from the UEs with UE ID=1, 4 and 7, respectively.

The task tags in the preservation table may be associated with the routing information. The association may be done by the MEC orchestrator. For example, each task tag may be associated with a representation of $$\text{Type\_X}(a1, b1 \| a2, b2) \qquad (1)$$

where Type_X is a behavior type number, a1 and b1 are identifiers of the source and target MEC entities of the first routing path (or raw data path), respectively, and a2 and b2 are identifiers of the source and target MEC entities of the second routing path (or result data path), respectively. It is noted that the representation of the routing information can be implemented in various of data formats, as long as the first routing path and the second routing path can be revealed.

Taking FIG. 2 as an example, if task tag 2 is associated with a representation of Type_1.S(1, 1∥1, 1), this means that the computation loading with task tag 2 is to be routed from the SN 104_1 to the SN 104_1, and the computation result with task tag 2 is also be the same. Likewise, taking FIG. 4 as an example, if task tag k is associated with a representation of Type_3(1, 1∥1, 2), this means that the computation loading with task tag k is to be routed from the SN 104_1 to the SN 104_1, and the computation result with task tag k is to be routed from the SN 104_1 to the SN 104_2.

Furthermore, as can be seen from FIGS. 2, 4 and 5, if the preservation table is transmitted by the MN 102 to the SN 104_1, then from the SN 104_1's point of view, possible behavior types may be "Type 1.S," "Type 3" and "Type 4." This is because only in the scenarios of "Type 1.S," "Type 3" and "Type 4," the SN 104_1 may keep and compute the received computation loading from the UE 106.

In some implementations, each task tag may be assigned a unique value. For example, the task tag may be generated from the VM ID and the UE ID, such as generated by multiplying or scrambling the UE ID and the VM ID. In one implementation, more than one task tag from the same UE may be assigned the same value. For example, in Table IV-1, task tag 1 and task tag k may have the same value.

Relay Table to SN

A relay table sent to an SN may instruct the SN to relay the received computation loading to another SN(s) or MN. An example of the relay table is shown in Table IV-2.

TABLE IV-2

| # of VM (VM ID) | To # of MEC entity (MEC entity ID) | | | | | | | |
|---|---|---|---|---|---|---|---|---|
| | 2 (for SN) | | | | ... | | | |
| | 1 | ... | 8 | ... | 3 | ... | 9 | ... |
| UE ID | 3 | ... | 8 | ... | 3 | ... | 9 | ... |
| Task TAG | 3 | ... | 8 | ... | 3k | ... | 9k | ... |
| | N (for SN) | | | | M (for MN) | | | |
| | 1 | ... | k | | 1 | ... | k | |
| | 5 ... 10 ... 5 | | ... 8 | | 6 ... 12 | | ... 10 ... 14 | |
| | 5 ... 10 ... 5k | | ... 8k | | 6 ... 12 | | ... 10k ... 14k | |

According to Table IV-2, the SN (e.g., SN #1) instructed by Table VI-2 may relay the computation loading to SN #2 to SN # N, or MN # M, depending on the behavior type. The task tags in the relay table may be associated with the routing information.

For example, if task tag 3 is associated with the routing information of Type_2.S(1, 2||2, 1), this means that the computation loading is to be relayed from the SN #1 (e.g., the SN 104_1 in FIG. 3) to the SN #2 (e.g., the SN 104_2 in FIG. 3), and the computation result is to be routed from the SN #2 to the SN #1. Likewise, if task tag 10k is associated with the routing information of Type_2.M(1, M||M, 1), this means that the computation loading is to be relayed from the SN #1 to the MN # M (e.g., the MN 102 in FIG. 3), and the MN # M may send back the computation result to the SN #1.

Furthermore, from the SN #1's point of view, possible types of UE behavior may be "Type 2.S," "Type 2.M," "Type 6.S," "Type 6.M," "Type 7.S" and "Type 7.M." This is because only in these behavior types, the SN #1 may directly relay the received computation loading to another MEC entity without performing computation.

Acceptation Table to SN

An acceptation table sent to an SN may instruct the SN to compute or process the received computation loading. An example of the acceptation table is shown in Table IV-3.

TABLE IV-3

| # of VM (VM ID) | From # of SN (MEC ID) | | | | |
|---|---|---|---|---|---|
| | 2 | | | | ... |
| | 1 | ... | k | | ... |
| UE ID | 11 ... 17 | ... | 11 | 20 | ... |
| Task TAG | 11 ... 17 | ... | 11k | 20k | ... |
| | N | | | | |
| | 1 | ... | k | | |
| | 16 ... 22 | ... | 19 | ... | 22 |
| | 16 ... 22 | ... | 19k | ... | 22k |

According to Table IV-3, it is assumed that the acceptation table is transmitted to the SN #1. The SN #1, which is instructed by the acceptation table of Table IV-3, may compute the computation loading received from the SN #2 to SN # N, depending on the behavior type. Each task tag may be associated with the corresponding routing information. The task tags in the acceptation table may be associated with the routing information.

For example, if task tag 11 is associated with the routing information of Type_7. S(2, 1||1, M), this means that the SN #1 may receive the computation loading relayed from the SN #2, and the SN #1 may generate and send the computation result to the MN # M. In such a case, the SN #1 is like the SN 104_2 in FIG. 8 in transmission behavior. Furthermore, from the SN #1's point of view, possible types of UE behavior may be "Type 2.S," "Type 6.S" and "Type 7.S."

In some implementations, the instruction tables are used in the MN side. Details of these kinds of instruction tables are described below.

Preservation Table to MN

In the implementation, the MN may maintain a preservation table indicating the computation loading(s) that needs to be kept and computed by the MN. An example of the preservation table is shown in Table V-1.

TABLE V-1

| # of VM (VM ID) | 1 | ... | k | | |
|---|---|---|---|---|---|
| UE ID | 27 | ... | 30 | ... | 27 ... 33 |
| Task TAG | 27 | ... | 30 | ... | 27k ... 33k |

Similar to Table IV-1, in Table V-1 there are k VMs running on the MN. For VM #1, it is instructed to keep and process the computation loadings from the UEs with the UE IDs=27 to 30. For VM # k, it is instructed to keep and process the computation loadings from the UEs with UE IDs=27 to 33.

The task tags in the preservation table may be associated with the routing information. For example, if in Table V-1, task tag 27 is associated with a representation of Type_1.M (M, M||M, M), this means that the raw data path is from the MN # M to the MN # M, and the result data path is also the same. Likewise, if the task tag 33k is associated with a representation of Type_5(M, M||M, 2), this means that the MN # M may keep and compute the received computing loading, and generate and transmit the computation result to the SN #2.

From the MN's point of view, possible behavior types may be "Type 1.M" and "Type 5." This is because only in these scenarios, the MN (e.g., the MN 102 in FIG. 2 and FIG. 6) may keep and compute the received computation loading.

Acceptation Table to MN

An acceptation table for an MN may let the MN compute or process the computation loading(s) relayed from other MEC entities. An example of the acceptation table is shown in Table V-2.

TABLE V-2

| | From # of SN (MEC ID) | | | | | |
|---|---|---|---|---|---|---|
| | 1 | | | ... | | |
| # of VM VM ID) | 1 | ... | k | ... | | |
| UE ID | 11 | ... | 17 | ... | 9 | 20 | ... |
| Task TAG | 11 | ... | 17 | ... | 9k | 20k | ... |
| | N | | | | | |
| | 1 | ... | | k | | |
| | 16 | ... | 22 | ... | 19 | ... | 33 |
| | 16 | ... | 22 | ... | 19k | ... | 33k |

Table V-2 and Table IV-3 may have similar data structures. The task tags in the acceptation table may be associated with the routing information.

For example, if task tag 22 is associated with the routing information of Type_7.M(1, M||M, M), this means that the MN # M may receive the computation loading from the SN #1, and generate the computation result accordingly. The MN # M may then send the computation result to the UE directly.

Furthermore, from the MN's point of view, possible behavior types may be "Type 2.M," "Type 5," "Type 6.M" and "Type 7.M." This is because only in these behavior types, the MN may compute the computation loading migrated from the SN.

In the present implementation, there is no relay table for the MN because it is assumed that the MN has the great computation power, and will not relay its computation loading to other SN(s). However, it can be understood that the present disclosure is not limited thereto. For example, the MN may maintain one or more relay tables for task offloading, if this may achieve greater system performance.

Figure 17:
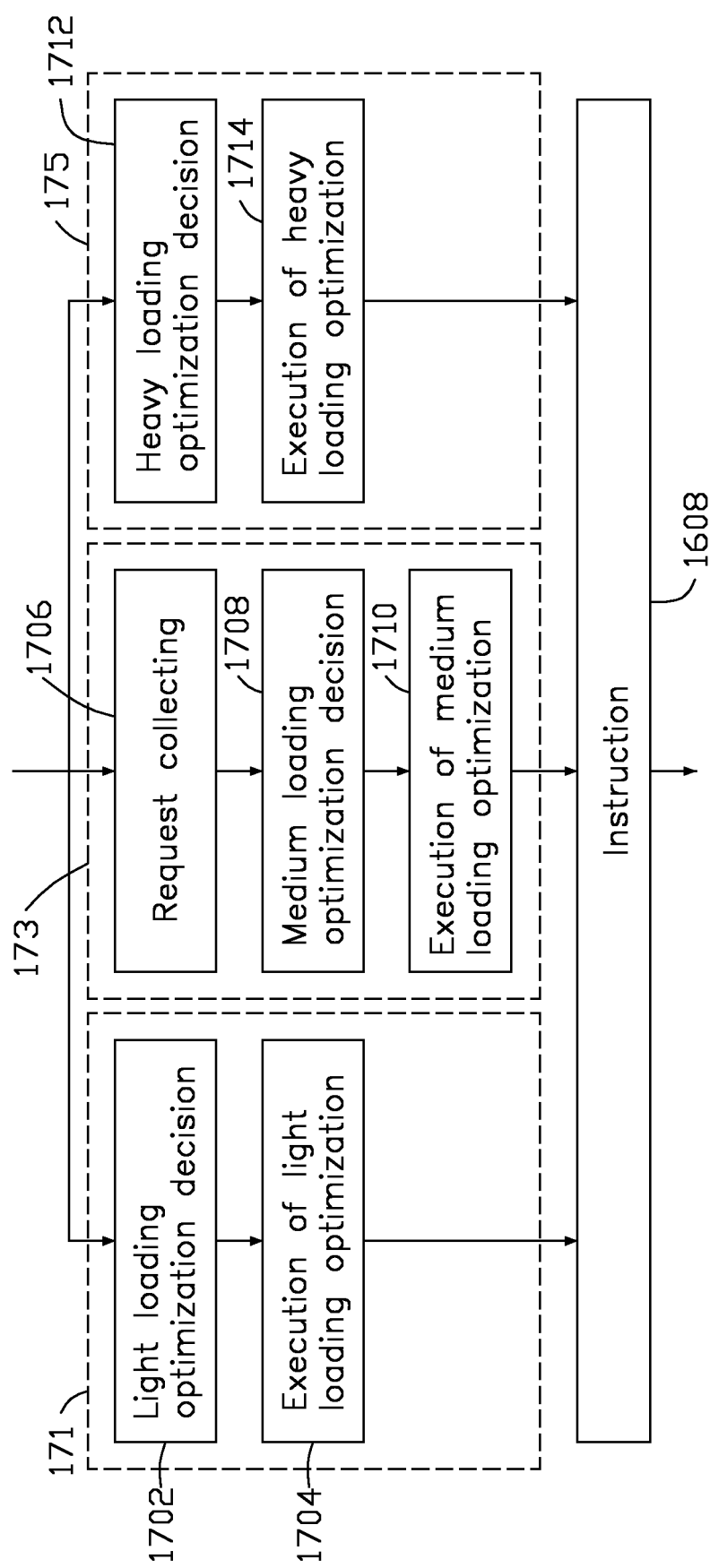
FIG. 17 illustrates a flowchart of the LDO procedure, in accordance with an implementation of the present disclosure.

FIG. 17 illustrates a flowchart of the LDO procedure, in accordance with an implementation of the present disclosure. The LDO procedure may substantially correspond to action 1606 in FIG. 16.

The LDO procedure may include a plurality of adjustment procedures, with each of which corresponding to a system computation loading level. As shown in FIG. 17, The adjustment procedures include an LC procedure 171, an MC procedure 173 and an HC procedure 175.

The LC procedure 171 includes actions 1702 and 1704. In action 1702, the MN decides to perform the light loading optimization when the system computation loading level is determined as the LC loading level (e.g., the system computation loading is lower than or equal to the LC threshold). In action 1704, the MN may execute the light loading optimization to limit or minimize the number of power-on SN in the MEC system.

The MC procedure 173 includes actions 1706, 1708 and 1710. In action 1706, the MN may collect one or more adjustment requests from the SN(s) in a collecting period of time. The length ($P_{LDOP\_C}$) of the collecting period of time may be shorter than the length ($P_{LDOP}$) of the period LDOP.

In action 1708, the MN decides to perform a medium loading optimization when the system computation loading level is determined as the MC loading level (e.g., the system computation loading is between the HC threshold and the LC threshold) and there is at least one adjustment request received from the SN(s). In action 1710, the MN executes the medium loading optimization to adjust the operation state or the loading state of the SN.

The HCP includes actions 1712 and 1714. In action 1712, the MN decides to perform a heavy loading optimization when the system computation loading level is determined as the HC loading level (e.g., the system computation loading is greater than or equal to the HC threshold). In action 1714, the MN executes the heavy loading optimization to balance the loading of the MEC entities in the MEC system. In one implementation, the heavy loading optimization may not turn off the SN(s).

Figure 18:
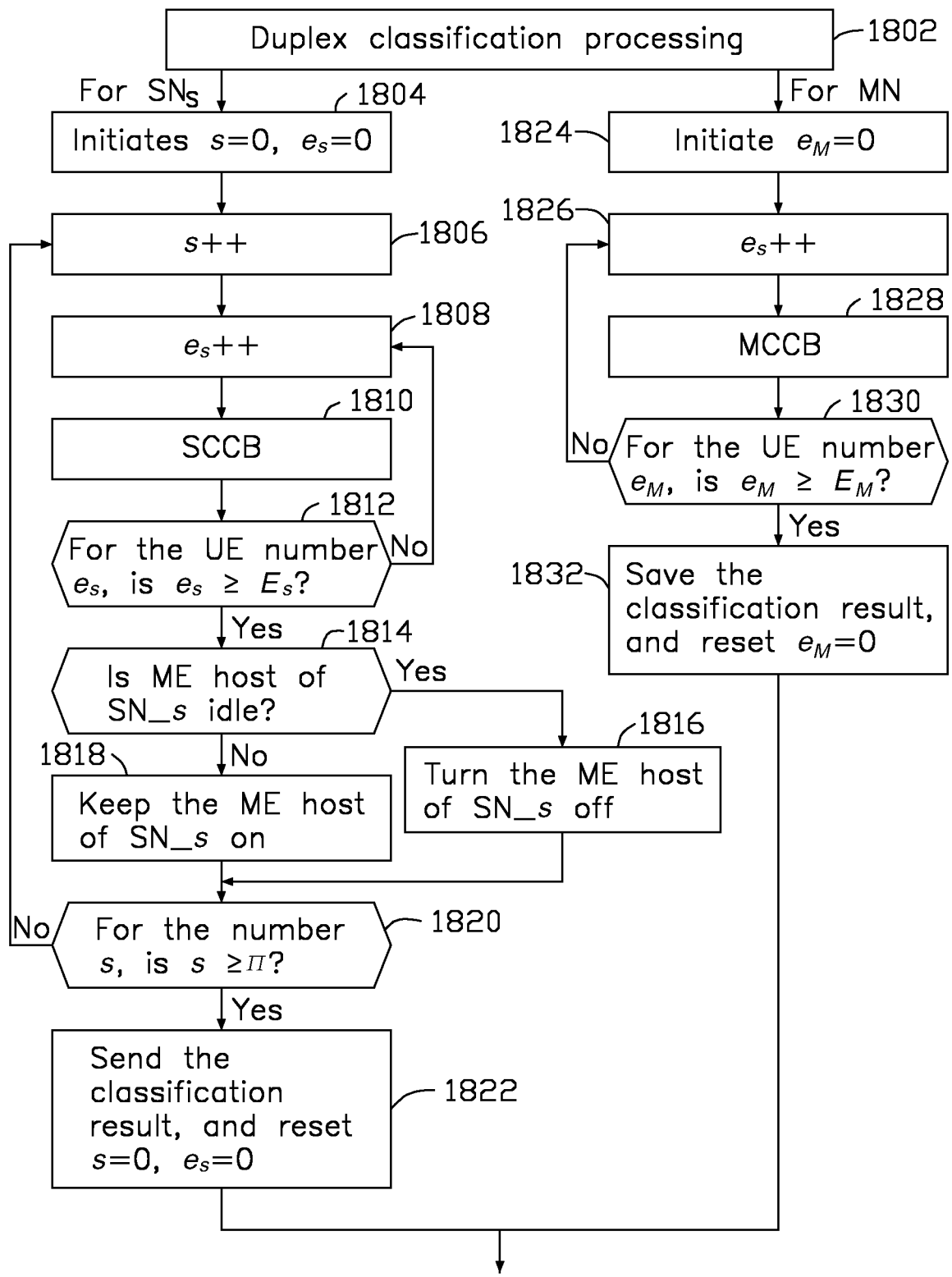
FIG. 18 illustrates a schematic algorithm of the light loading optimization, in accordance with an implementation of the present disclosure.

FIG. 18 illustrates a schematic algorithm of the light loading optimization, in accordance with an implementation of the present disclosure. The schematic algorithm may substantially correspond to action 1704 in FIG. 17.

In the present implementation, it is assumed that there are $E_M$ UEs attaching to the MN and there are Es UEs attaching to the SN_s for computation loading distribution, where s∈{1, 2, ... II} and $e_s$∈{1, 2, ..., $E_s$}.

The schematic algorithm includes actions 1802 to 1832, in which actions 1804 to 1822 are for the SN side, and actions 1824 to 1832 are for the MN side.

In action 1802, the MN duplexes the classification process for the SN side and the MN side.

For the SN side, in action 1804, the values of s and $e_s$ are reset. For example, s=0 and $e_s$=0.

In actions 1806 and 1808, the values of s and $e_s$ are increased (e.g., increased by 1).

In action 1810, the MN performs the SCCB procedure to determine the behavior type of the UE_$e_s$ attaching to the SN_s.

In action 1812, the MN checks whether $e_s$≥$E_s$.

If the outcome of action 1812 is No, the process goes back to action 1808, in which the MN may determine the next UE_$e_s$'s behavior type.

If the outcome of action 1812 is Yes, the process moves to action 1814, in which the MN may check whether the ME host of the SN_s is idle or not.

If the ME host of the SN_s is idle, in action 1816, the MN may turn off the ME host of the SN_s to reduce the power consumption.

If the ME host of the SN_s is not in an idle state, in action 1818, the MN may keep it power-on.

In action 1820, the MN checks whether s≥II. If s≥II, in action 1822, the MN may send the classification result (e.g., the behavior type) of the SCCB procedure to the SN(s), and reset the values of s and $e_s$. If s<II, the process goes back to action 1806 to select the next SN_s.

For the MN side, in action 1824, the value of $e_M$ is reset. For example, $e_M=0$.

In actions 1826, the value of $e_M$ is increased (e.g., increased by 1).

In action 1828, the MN performs the MCCB procedure to determine the behavior type of the UE_$e_M$ attaching to the MN.

In action 1830, the MN checks whether $e_M \geq E_M$. If $e_M \geq E_M$, in action 1832, the MN may save the classification result (e.g., the behavior type) of the MCCB procedure, and reset the value of $e_M$. If $e_M < E_M$, the process goes back to action 1826 to select the next UE_$e_M$.

Figure 19:
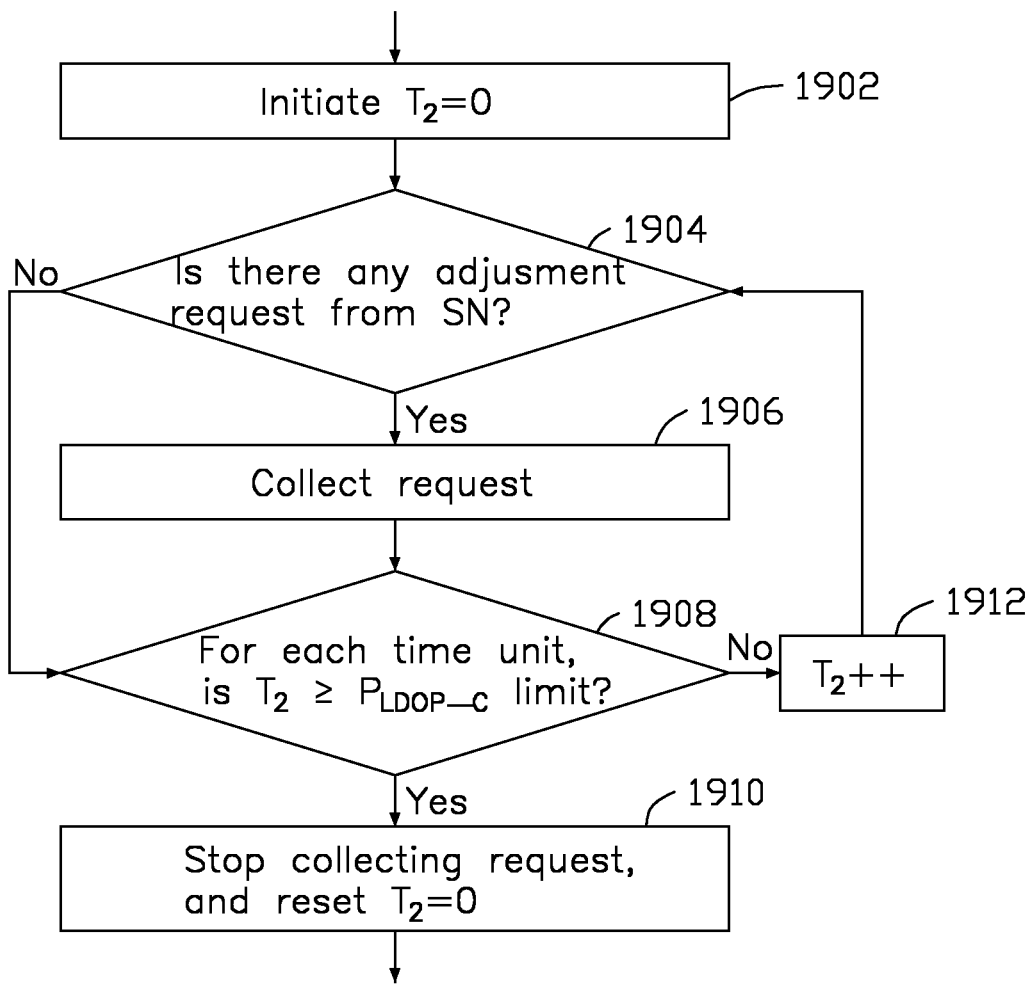
FIG. 19 illustrates a flowchart of a request collection scheme in the LDO procedure, in accordance with an implementation of the present disclosure.

FIG. 19 illustrates a flowchart of a request collection scheme in the LDO procedure, in accordance with an implementation of the present disclosure. The request collection scheme may substantially correspond to action 1706 in FIG. 17. Through the request collection scheme, the MN may collect the adjustment request from the SN during a certain time period (e.g., the collecting period of time).

In action 1902, the MN resets a count value of a timer, $T_2$. For example, $T_2=0$.

In action 1904, the MN checks whether there is any adjustment request from the SN or not. The adjustment request is configured to request the MN to adjust the operation state and/or the loading state of the SN. For example, the MN may turn on/off the computation node of the SN in response to the adjustment request. For example, the MN may offload/process a computation loading to/from another MEC entity in response to the adjustment request.

If the outcome of the determination in action 1904 is Yes, in action 1906, the MN collects the adjustment request from the SN, and enters action 1908, in which the MN determines whether $T_2 \geq P_{LDOP\_C}$ for each collecting period of time.

If the outcome of the determination in action 1904 is No, the process also continues to action 1908.

If the outcome of the determination in action 1908 is Yes, in action 1910, the MN stops collecting the adjustment request from the SN, and resets $T_2=0$.

If the outcome of determination in action 1908 is No, in action 1912, the value of $T_2$ is increased (e.g., increased by 1), and then the process moves back to action 1904 to check whether there is any new incoming adjustment request.

Figure 20:
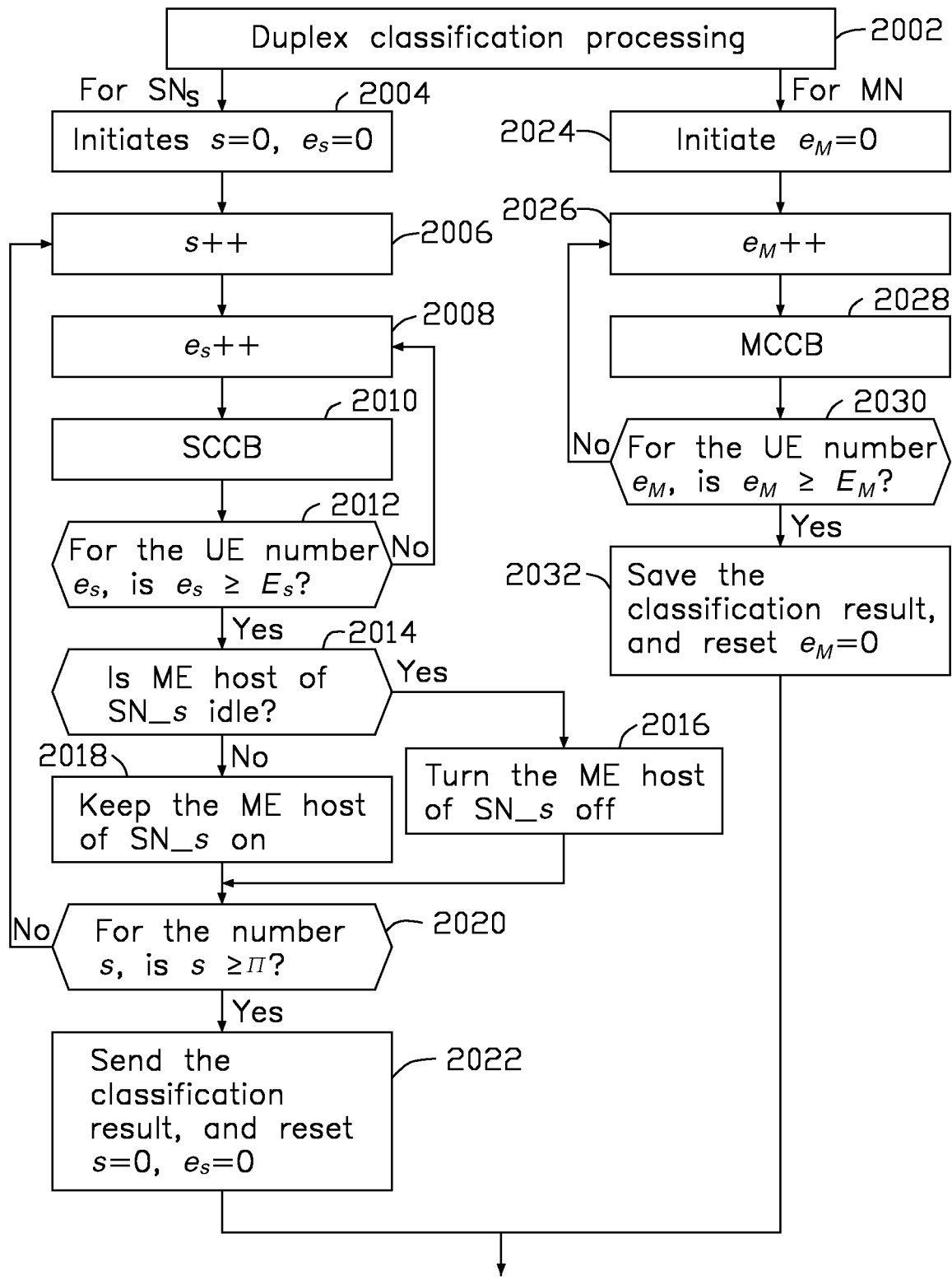
FIG. 20 illustrates a schematic algorithm of the medium loading optimization, in accordance with an implementation of the present disclosure.

FIG. 20 illustrates a schematic algorithm of the medium loading optimization, in accordance with an implementation of the present disclosure. The schematic algorithm may substantially correspond to action 1710 in FIG. 17.

Similar to the light loading optimization, in the implementation, it is assumed that there are $E_M$ UEs attaching to the MN and there are Es UEs attaching to the SN_s for computation loading distribution, where s∈{1, 2, . . . , II} and $e_s$∈{1, 2, . . . , $E_s$}.

The schematic algorithm includes actions 2002 to 2032, in which actions 2004 to 2022 are for the SN side, and actions 2024 to 2032 are for the MN side.

In action 2002, the MN duplexes the classification process for the SN side and the MN side.

For the SN side, in action 2004, the values of s and $e_s$ are reset. For example, s=0 and $e_s=0$.

In actions 2006 and 2008, the values of s and $e_s$ are increased (e.g., increased by 1).

In action 2010, the MN performs the SCCB procedure to determine the behavior type of the UE_$e_s$ attaching to the SN_s.

In action 2012, the MN checks whether $e_s \geq E_s$.

If the outcome of action 2012 is No, the process goes back to action 2008, in which the MN may determine the next UE_$e_s$'s behavior type.

If the outcome of action 2012 is Yes, the process moves to action 2014, in which the MN may check whether the ME host of the SN_s is idle or not.

If the ME host of the SN_s is idle, in action 2016, the MN may turn off the ME host of the SN_s to reduce the power consumption.

If the ME host of the SN_s is not in an idle state, in action 2018, the MN may keep it power-on.

In action 2020, the MN checks whether s≥II. If s≥II, in action 2022, the MN may send the classification result (e.g., the behavior type) of the SCCB procedure to the SN(s), and reset the values of s and $e_s$. If s<II, the process goes back to action 2006 to select the next SN_s.

For the MN side, in action 2024, the value of $e_M$ is reset. For example, $e_M=0$.

In actions 2026, the value of $e_M$ is increased (e.g., increased by 1).

In action 2028, the MN performs the MCCB procedure to determine the behavior type of the UE_$e_M$ attaching to the MN.

In action 2030, the MN checks whether $e_M \geq E_M$. If $e_M \geq E_M$, in action 2032, the MN may save the classification result (e.g., the behavior type) of the MCCB procedure, and reset the value of $e_M$. If $e_M < E_M$, the process goes back to action 2026 to select the next UE_$e_M$.

Figure 21:
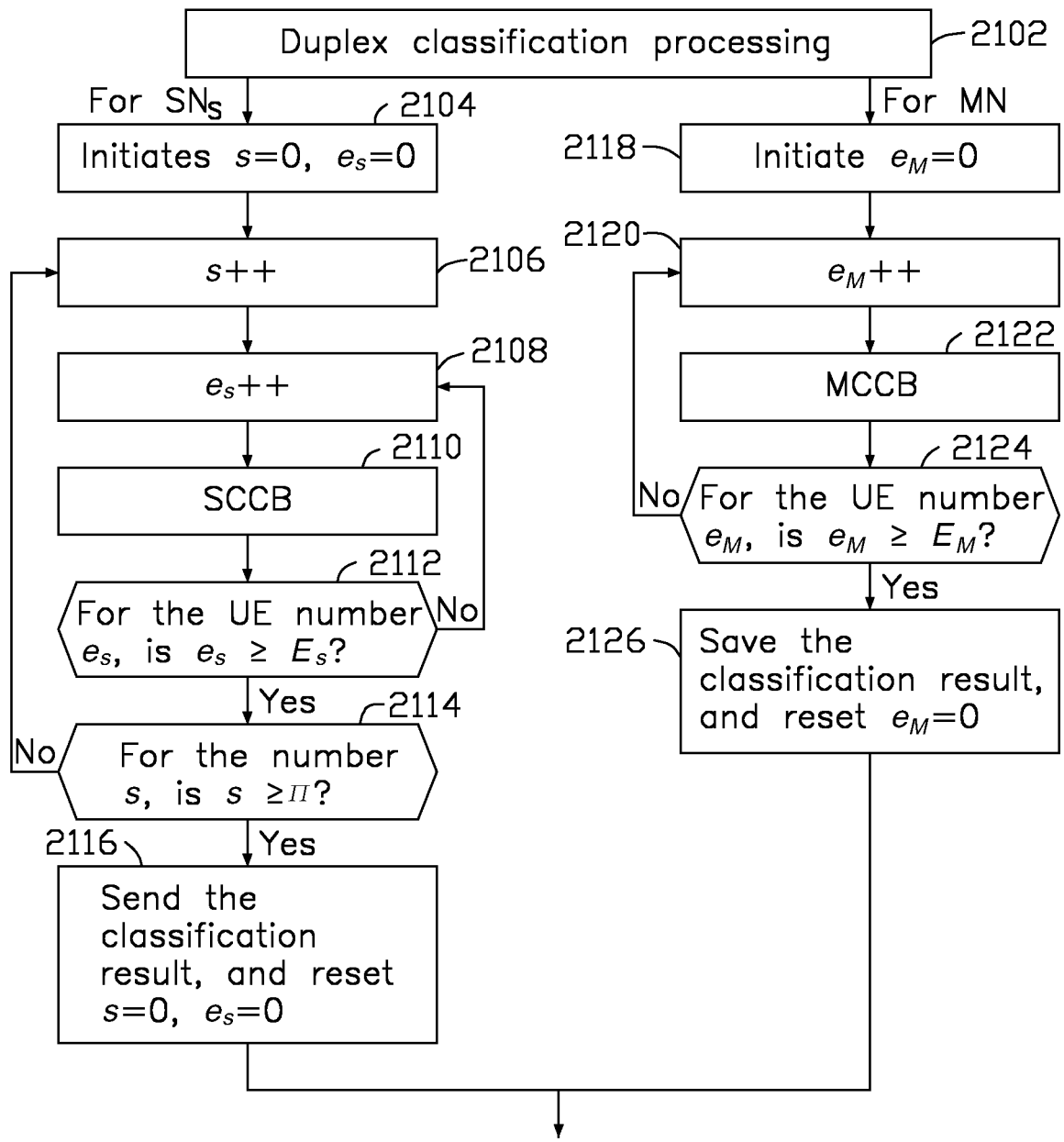
FIG. 21 illustrates a schematic algorithm of the heavy loading optimization, in accordance with an implementation of the present disclosure.

FIG. 21 illustrates a schematic algorithm of the heavy loading optimization, in accordance with an implementation of the present disclosure. The schematic algorithm may substantially correspond to action 1714 in FIG. 17.

In the implementation, it is assumed that there are $E_M$ UEs attaching to the MN and there are Es UEs attaching to the SN_s for computation loading distribution, where s∈{1, 2, . . . , II} and $e_s$∈{1, 2, . . . , $E_s$}.

The schematic algorithm includes actions 2102 to 2126, in which actions 2104 to 2116 are for the SN side, and actions 2118 to 2126 are for the MN side.

In action 2102, the MN duplexes the classification process for the SN side and the MN side.

For the SN side, in action 2104, the values of s and $e_s$ are reset. For example, s=0 and $e_s=0$.

In actions 2106 and 2108, the values of s and $e_s$ are increased (e.g., increased by 1).

In action 2110, the MN performs the SCCB procedure to determine the behavior type of the UE_$e_s$.

In action 2112, the MN checks whether $e_s \geq E_s$.

If $e_s$<E, the process goes back to action 2108, in which the MN may determine the next UE_$e_s$'s behavior type.

If $e_s \geq E_s$, the process moves to action 2114, in which the MN may further check whether s≥II.

If s≥II, in action 2122, the MN may send the classification result (e.g., the behavior type) of the SCCB procedure to the SN(s), and reset the values of s and $e_s$. If s<II, the process goes back to action 2106 to select the next SN_s.

For the MN side, in action 2118, the value of $e_M$ is reset. For example, $e_M=0$.

In action 2120, the value of $e_M$ is increased (e.g., increased by 1).

In action 2122, the MN performs the MCCB procedure to determine the UE_$e_M$'s behavior type.

In action 2124, the MN checks whether $e_M \geq E_M$. If $e_M \geq E_M$, in action 2126, the MN may save the classification result (e.g., the behavior type) of the MCCB procedure, and reset the value of $e_M$. If $e_M < E_M$, the process goes back to action 2120 to select the next UE_$e_M$.

Figure 22:
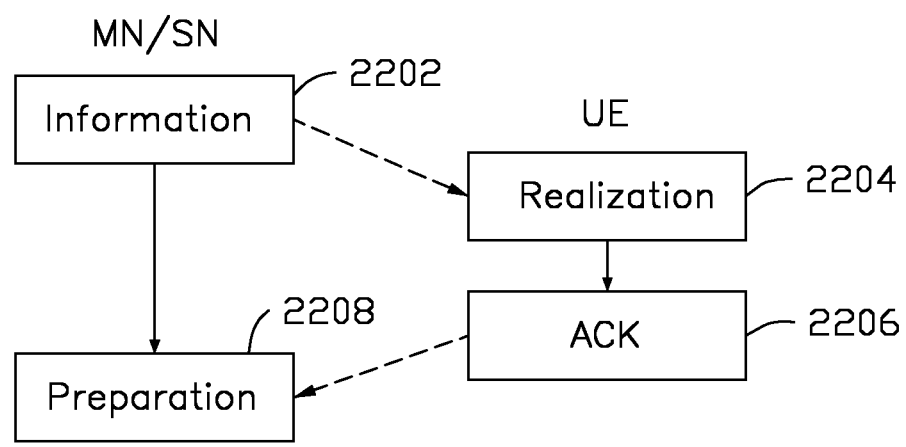
FIG. 22 illustrates a flowchart of an AE procedure, in accordance with an implementation of the present disclosure.

FIG. 22 illustrates a flowchart of an AE procedure, in accordance with an implementation of the present disclosure. In the present implementation, the AE procedure includes actions 2202 to 2208.

In action 2202, the MN or the SN may inform the UE of the result of optimization (e.g., the VM migration and/or HO process policies).

In action 2024, the UE analyze the result of optimization to realize how to perform the HO process and VM migration.

In action 2206, the UE replies an acknowledgment (ACK) to the MN or SN.

In action 2208, the MN or SN prepares to enter the period MECP and perform the optimized MEC scheme. Details of the preparation scheme will be described in reference with FIG. 23.

Figure 23:
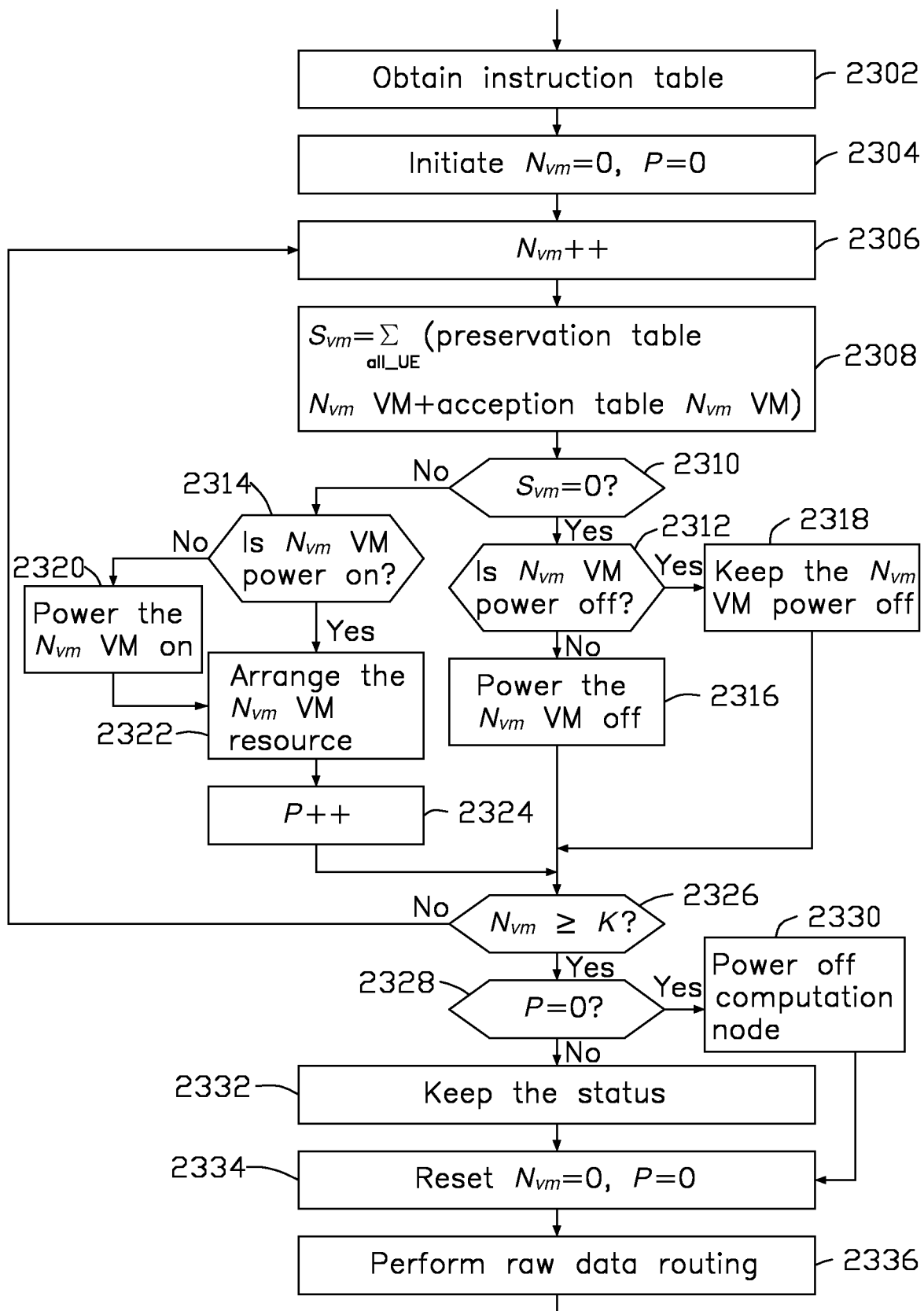
FIG. 23 illustrates a flowchart of the preparation scheme in the AE procedure.

FIG. 23 illustrates a flowchart of the preparation scheme in the AE procedure. The preparation scheme may substantially correspond to action 2208 of FIG. 22.

In action 2302, the MN or SN obtains the instruction table.

In action 2304, the values of the VM index $N_{vm}$ and the power-on VM counter P are reset, e.g., $N_{vm}=0$ and P=0, where $N_{vm} \in \{1, \ldots, K\}$ which means that there are K VMs (or APPs). The value of K can be dynamically adjusted.

In action 2306, the value $N_{vm}$ is increased (e.g., increased by 1).

In action 2308, a summation $S_{vm}$ is calculated:

$$S_{vm} = \sum_{all\_UE} (\text{preservation table } N_{vm}VM + \text{acceptation table } N_{vm}VM)$$

In action 2310, the MN or the SN checks whether $S_{vm}=0$.

If $S_{vm}=0$, which means that the $N_{vm}$ VM is not involved in either the preservation table or the acceptation table, the MN or the SN may control the $N_{vm}$ VM to operate in the power-off, as shown in actions 2132, 2316 and 2318.

If $S_{vm} \neq 0$, the MN or the SN may control the $N_{vm}$ VM to operate in the power-on state, and arrange the resource of the power-on $N_{vm}$ VM, as shown in actions 2314, 2320 and 2322.

In action 2324, the value of P is increased (e.g., increased by 1) to indicate that the number of power-on $N_{vm}$ VM is increased.

In action 2326, the MN or the SN checks whether $N_{vm} \geq K$. If $N_{vm} \geq K$, in action 2328, the MN or SN further checks whether P=0. If $N_{vm} < K$, the process goes back to action 2306.

If P=0, in action 2330, the MN or the SN may power off the computation node of the SN.

If $P \neq 0$, the MN or the SN may keep the status of the $N_{vm}$ VM, and reset the values of $N_{vm}$ and P, as shown in actions 2332 and 2334.

In action 2336, the MEC system performs raw data routing to forward the computation loading through the raw data path.

Figure 24:
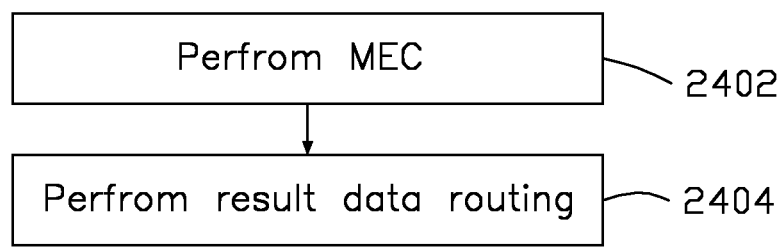
FIG. 24 illustrates a flowchart of an MEC performing procedure, in accordance with an implementation of the present disclosure.

FIG. 24 illustrates a flowchart of an MEC performing procedure, in accordance with an implementation of the present disclosure.

In action 2402, the MEC system performs the optimized MEC scheme in the rest of PP (Processing Period). For example, for those MEC entities receiving the preservation table(s) or the acceptation table(s), they may perform MEC computation on the received computation loading to generate the computation result.

In action 2404, the MEC system may perform result data routing to forward the computation result to the UE.

Figure 25:
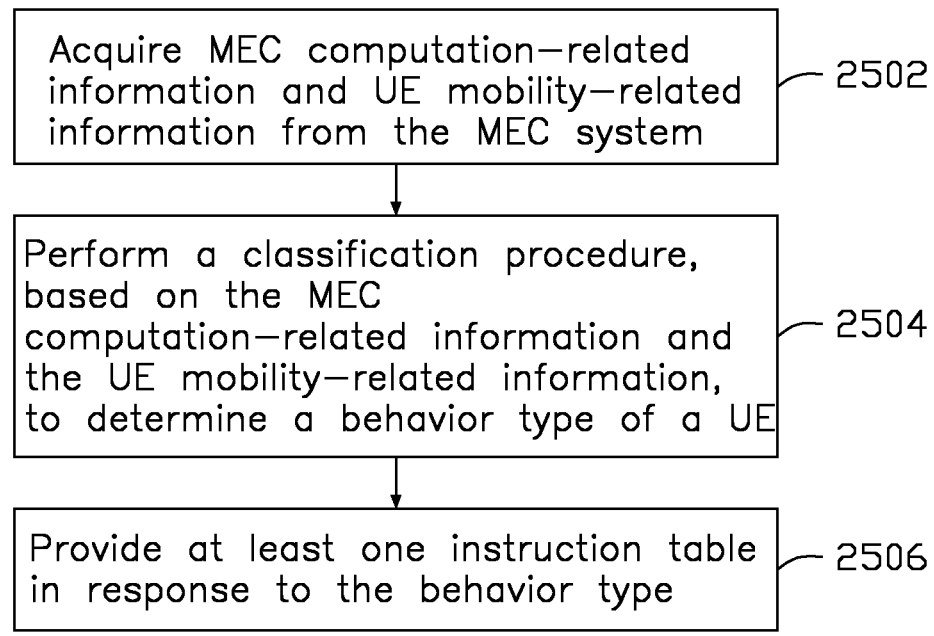
FIG. 25 illustrates a flowchart of a method for optimizing an MEC system, in accordance with an implementation of the present disclosure.

FIG. 25 illustrates a flowchart of a method for optimizing an MEC system, in accordance with an implementation of the present disclosure. The MEC system may include a plurality of MEC entities, which include at least one MN and at least one SN. In the present implementation, the MN may act as an MEC orchestrator to control the SN(s) operations.

In action 2502, the MEC orchestrator may acquire MEC computation-related information and UE mobility-related information from the MEC system.

In action 2504, the MEC orchestrator may perform a classification procedure, based on the MEC computation-related information and the UE mobility-related information, to determine a behavior type of a UE. The behavior type may be used to indicate whether to trigger a HO process in the MEC system, and whether to trigger a VM migration in the MEC system.

In action 2506, the MEC orchestrator may provide at least one instruction table in response to the behavior type. The instruction table may include routing information for routing MEC traffic among one or more of the MEC entities.

As described herein, the MEC orchestrator may perform a series of classifications, such as the SCCB procedure or the MCCB procedure, to determine whether to trigger the HO process and/or the VM migration in the MEC system, and use the classification result (e.g., the behavior type of a UE) to manage the computation resources in the MEC system.

In various implementations of the present disclosure, the term, MEC, may also be the abbreviation of "Multi-access Edge Computing." In addition, the architecture and behavior of the MEC system may be applied to a Fog node system. For example, each MEC entity described herein can be replaced by a fog computing node.

Figure 26:
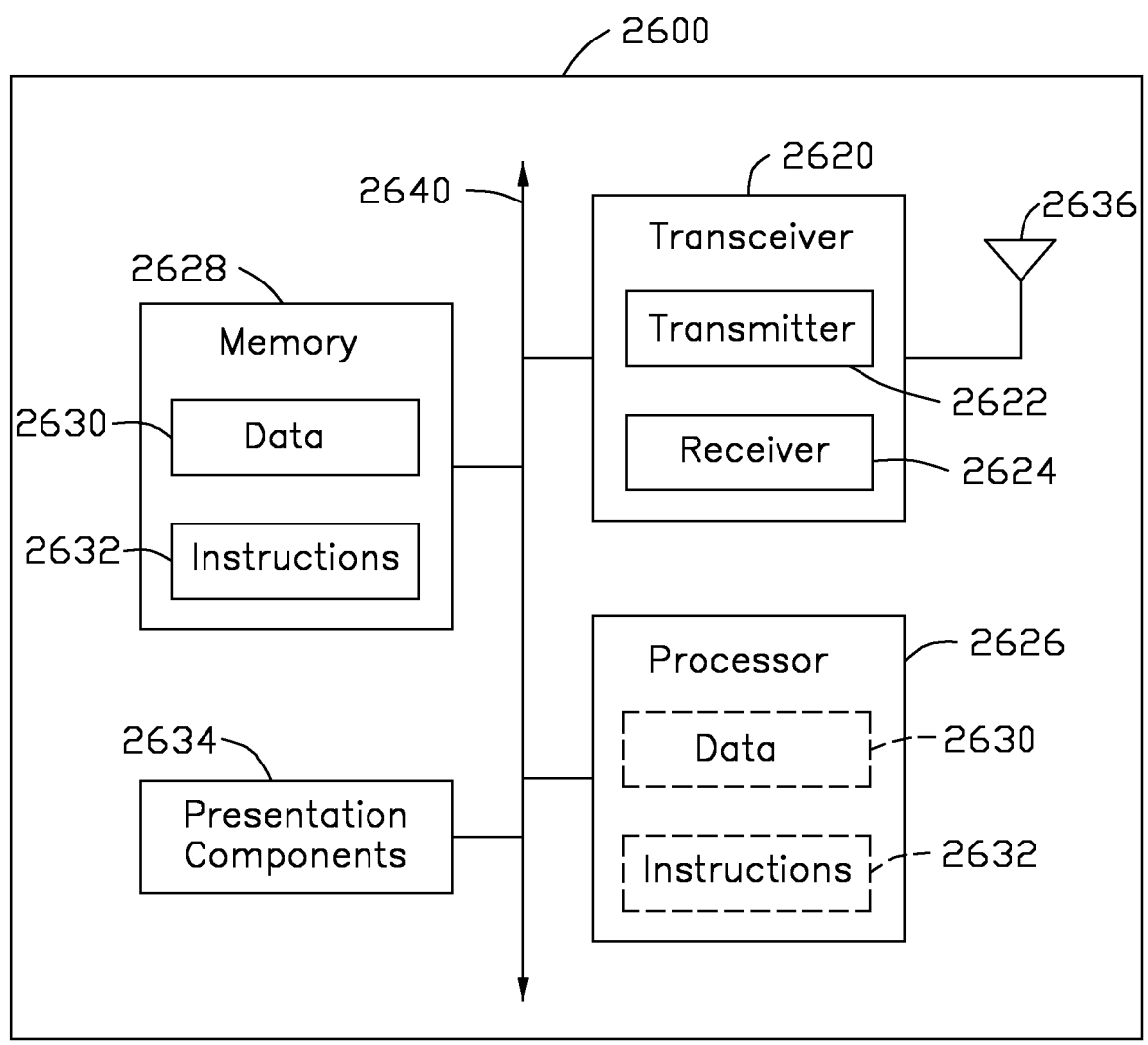
FIG. 26 illustrates a block diagram of a node for wireless communication, in accordance with various aspects of the present application.

FIG. 26 illustrates a block diagram of a node for wireless communication, in accordance with various aspects of the present application. As shown in FIG. 26, a node 2600 may include a transceiver 2620, a processor 2626, a memory 2628, one or more presentation components 2634, and at least one antenna 2636. The node 2600 may also include an RF spectrum band module, a base station communications module, a network communications module, and a system communications management module, input/output (I/O) ports, I/O components, and power supply (not explicitly shown in FIG. 26). Each of these components may be in communication with each other, directly or indirectly, over one or more buses 2640. In one implementation, the node 2600 may be a UE or an MEC entity (e.g., a base station) that performs various functions described herein, for example, with reference to FIGS. 1 through 25.

The transceiver 2620 having a transmitter 2622 (e.g., transmitting/transmission circuitry) and a receiver 2624 (e.g., receiving/reception circuitry) may be configured to transmit and/or receive time and/or frequency resource partitioning information. In some implementations, the transceiver 2620 may be configured to transmit in different types of subframes and slots including, but not limited to, usable, non-usable and flexibly usable subframes and slot formats. The transceiver 2620 may be configured to receive data and control channels.

The node 2600 may include a variety of computer-readable media. Computer-readable media can be any available media that can be accessed by the node 2600 and include both volatile and non-volatile media, removable and non-removable media. By way of example, and not limitation, computer-readable media may comprise computer storage media and communication media. Computer storage media includes both volatile and non-volatile, removable and non-removable media implemented in any method or technology for storage of information such as computer-readable.

Computer storage media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media does not comprise a propagated data signal. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

The memory 2628 may include computer-storage media in the form of volatile and/or non-volatile memory. The memory 2628 may be removable, non-removable, or a combination thereof. Exemplary memory includes solid-state memory, hard drives, optical-disc drives, and etc. As illustrated in FIG. 26, The memory 2628 may store computer-readable, computer-executable instructions 2632 (e.g., software codes) that are configured to, when executed, cause the processor 2626 to perform various functions described herein, for example, with reference to FIGS. 1 through 25. Alternatively, the instructions 2632 may not be directly executable by the processor 2626 but be configured to cause the node 2600 (e.g., when compiled and executed) to perform various functions described herein.

The processor 2626 (e.g., having processing circuitry) may include an intelligent hardware device, e.g., a central processing unit (CPU), a microcontroller, an ASIC, and etc. The processor 2626 may include memory. The processor 2626 may process the data 2630 and the instructions 2632 received from the memory 2628, and information through the transceiver 2620, the base band communications module, and/or the network communications module. The processor 2626 may also process information to be sent to the transceiver 2620 for transmission through the antenna 2636, to the network communications module for transmission to a core network.

One or more presentation components 2634 presents data indications to a person or other device. Exemplary presentation components 2634 include a display device, speaker, printing component, vibrating component, and etc.

From the above description, it is manifested that various techniques may be used for implementing the concepts described in the present application without departing from the scope of those concepts. Moreover, while the concepts have been described with specific reference to certain implementations, a person of ordinary skill in the art would recognize that changes may be made in form and detail without departing from the scope of those concepts. As such, the described implementations are to be considered in all respects as illustrative and not restrictive. It should also be understood that the present application is not limited to the particular implementations described above, but many rearrangements, modifications, and substitutions are possible without departing from the scope of the present disclosure.

What is claimed is:

1. A method, performed by a Mobile Edge Computing (MEC) orchestrator, comprising:
   acquiring MEC computation-related information and User Equipment (UE) mobility-related information from an MEC system including a plurality of MEC entities;
   performing a classification procedure, based on the MEC computation-related information and the UE mobility-related information, to determine a behavior type of a UE, the behavior type indicating whether to trigger a handover (HO) in the MEC system and whether to trigger a Virtual Machine (VM) migration in the MEC system;
   comparing a system computation loading with one or more loading thresholds to determine a system computation loading level;
   performing one of a plurality of adjustment procedures m response to the system computation loading level, wherein the adjustment procedures include:
      a first adjustment procedure to turn off a computation node of a first MEC entity that operates in an idle state;
      a second adjustment procedure to adjust an operation state of a second MEC entity in response to an adjustment request from the second MEC entity; and
      a third adjustment procedure to offload a computation loading from a third MEC entity to a fourth MEC entity; and
   providing an instruction table in response to the behavior type, the instruction table including routing information for routing MEC traffic among one or more of the plurality of MEC entities.

2. The method of claim 1, wherein the instruction table comprises a VM identity (ID), a UE ID, and a task tag associated with the routing information.

3. The method of claim 2, wherein the task tag is generated from the UE ID and the VM ID.

4. The method of claim 3, wherein the task tag is generated by multiplying the UE ID and the VM ID.

5. The method of claim 2, wherein the instruction table further comprises an MEC entity ID.

6. The method of claim 1, wherein the routing information includes:
   a first routing path indicating a first pair of MEC entities between which a computation loading is to be transmitted, and
   a second routing path indicating a second pair of MEC entities between which a computation result of the computation loading is to be transmitted.

7. The method of claim 1, wherein the plurality of loading thresholds comprises a first loading threshold and a second loading threshold lower than the first loading threshold, and the method further comprises:
   performing the first adjustment procedure when the system computation loading is lower than or equal to the second loading threshold;
   performing the second adjustment procedure when the system computation loading is between the first loading threshold and the second loading threshold and the adjustment request is received; and performing the third adjustment procedure when the system computation loading is greater than or equal to the first loading threshold.

8. The method of claim 1, wherein the classification procedure includes:
    determining, according to the MEC computation-related information, whether a computation loading distributed from the UE is to be computed on one of the plurality of MEC entities; and
    determining, according to the UE mobility-related information, whether the UE leaves a coverage area of the one of the plurality of MEC entities.

9. The method of claim 1, wherein the UE mobility-related information includes at least one of velocity information, acceleration information, direction information and location information.

10. An Mobile Edge Computing (MEC) orchestrator, comprising:
    one or more non-transitory computer-readable media having computer-executable instructions embodied thereon; and
    at least one processor coupled to the one or more non-transitory computer-readable media, and configured to execute the computer-executable instructions to:
    acquire MEC computation-related information and User Equipment (UE) mobility-related information from an MEC system including a plurality of MEC entities;
    perform a classification procedure, based on the MEC computation-related information and the UE mobility-related information, to determine a behavior type of a UE, the behavior type indicating whether to trigger a handover (HO) in the MEC system and whether to trigger a Virtual Machine (VM) migration in the MEC system;
    compare a system computation loading with one or more loading thresholds to determine a system computation loading level;
    perform one of a plurality of adjustment procedures in response to the system computation loading level, wherein the adjustment procedures include:
        a first adjustment procedure to turn off a computation node of a first MEC entity that operates in an idle state;
        a second adjustment procedure to adjust an operation state or a loading state of a second MEC entity in response to an adjustment request from the second MEC entity; and
        a third adjustment procedure to offload a computation loading from a third MEC entity to a fourth MEC entity; and
    provide an instruction table in response to the behavior type, the instruction table including routing information for routing MEC traffic among one or more of the plurality of MEC entities.

11. The MEC orchestrator of claim 10, wherein the instruction table comprises a VM identity (ID), a UE ID, and a task tag associated with the routing information.

12. The MEC orchestrator of claim 11, wherein the task tag is generated from the UE ID and the VM ID.

13. The MEC orchestrator of claim 12, wherein the task tag is generated by multiplying the UE ID and the VM ID.

14. The MEC orchestrator of claim 11, wherein the instruction table further comprises an MEC entity ID.

15. The MEC orchestrator of claim 10, wherein the routing information includes:
    a first routing path indicating a first pair of MEC entities between which a computation loading is to be transmitted, and
    a second routing path indicating a second pair of MEC entities between which a computation result of the computation loading is to be transmitted.

16. The MEC orchestrator of claim 10, wherein the loading thresholds comprise a first loading threshold and a second loading threshold lower than the first loading threshold, and the at least one processor coupled to the one or more non-transitory computer-readable media is further configured to execute the computer-executable instructions to:
    perform the first adjustment procedure when the system computation loading is lower than or equal to the second loading threshold;
    perform the second adjustment procedure when the system computation loading is between the first loading threshold and the second loading threshold and the adjustment request is received; and
    perform the third adjustment procedure when the system computation loading is greater than or equal to the first loading threshold.

17. The MEC orchestrator of claim 10, wherein the classification procedure includes:
    determining, according to the MEC computation-related information, whether a computation loading distributed from the UE is to be computed on one of the plurality of MEC entities; and
    determining, according to the UE mobility-related information, whether the UE leaves a coverage area of the one of the plurality of MEC entities.

18. The MEC orchestrator of claim 10, wherein the UE mobility-related information includes at least one of velocity information, acceleration information, direction information and location information.

* * * * *